(12) United States Patent
Hughes

(10) Patent No.: US 7,226,090 B2
(45) Date of Patent: *Jun. 5, 2007

(54) ROD AND TUBING JOINT OF MULTIPLE ORIENTATIONS CONTAINING ELECTRICAL WIRING

(75) Inventor: William James Hughes, Bixby, OK (US)

(73) Assignee: Sunstone Corporation, Oklahoma City, OK (US)

( * ) Notice: Subject to any disclaimer, the term of this patent is extended or adjusted under 35 U.S.C. 154(b) by 305 days.

This patent is subject to a terminal disclaimer.

(21) Appl. No.: 10/671,141

(22) Filed: Sep. 25, 2003

(65) Prior Publication Data

US 2005/0022999 A1 Feb. 3, 2005

Related U.S. Application Data

(63) Continuation-in-part of application No. 10/633,471, filed on Aug. 1, 2003.

(51) Int. Cl.
*F16L 25/01* (2006.01)
*H01R 4/60* (2006.01)
*H01R 4/64* (2006.01)

(52) U.S. Cl. .............. 285/330; 285/913; 285/914; 439/191; 439/194; 439/195

(58) Field of Classification Search ............. 285/913, 285/914, 330; 439/191, 194, 195, 271
See application file for complete search history.

(56) References Cited

U.S. PATENT DOCUMENTS 96,545 A * 11/1869 Brady ................... 285/330
398,620 A * 2/1889 Jobes ................... 285/114
600,988 A * 3/1898 Hayes ................... 285/330

(Continued)

FOREIGN PATENT DOCUMENTS

GB 2 110 270 6/1983

(Continued)

OTHER PUBLICATIONS

Enviromental Applications of Horizontal Wells, Nov. 1992, George J. Hall.

(Continued)

*Primary Examiner*—James M. Hewitt
(74) *Attorney, Agent, or Firm*—Rudolf O. Siegesmund; Gordon & Rees, LLP

(57) ABSTRACT

A rod and tubing connection for coupling two or more joints of tubing sections comprises a plug and a socket. The plug has a plurality of splines and the socket has a plurality of receptacles adapted to receive the plurality of splines. The plurality of splines comprises a center spline and a plurality of outer splines configured to allow intermeshing with receptacle splines in a plurality of orientations. A coupling collar is used to secure the tubing joint. The plug is connected to the socket in a four-step process of: positioning the plug and socket in close proximity, aligning the spline and the receptacle, plugging the spline into the receptacle, and then securing the plug and socket together with the coupling collar. The tubing joint may also have a conduit containing a wire for transmitting power and data between the adjoined sections of tubing.

2 Claims, 18 Drawing Sheets

U.S. PATENT DOCUMENTS

| | | | |
|---|---|---|---|
| 1,031,587 A * | 7/1912 | Reisik | 285/330 |
| 1,054,812 A | 3/1913 | Zierath | |
| 1,372,238 A * | 3/1921 | Kreiter | 285/89 |
| 1,438,751 A | 12/1922 | Des Isles | |
| 1,494,524 A * | 5/1924 | Adamson | 89/16 |
| 1,504,363 A * | 8/1924 | Madigan | 285/148.16 |
| 1,547,759 A * | 7/1925 | Journeay | 285/85 |
| 1,589,781 A * | 6/1926 | Anderson | 285/330 |
| 1,781,091 A | 11/1930 | Wilson | |
| 1,849,066 A * | 3/1932 | Bridges | 403/333 |
| 1,954,812 A * | 4/1934 | Hanlon et al. | 91/16 |
| 2,109,344 A * | 2/1938 | Selger | 285/330 |
| 2,273,017 A | 2/1942 | Boynton | |
| 2,296,198 A * | 9/1942 | Boynton | 285/91 |
| 2,314,867 A * | 3/1943 | Boynton | 285/81 |
| 2,464,744 A * | 3/1949 | Fennema | 285/330 |
| 2,748,358 A * | 5/1956 | Johnston | 439/194 |
| 2,750,569 A * | 6/1956 | Moon | 439/194 |
| 3,361,453 A * | 1/1968 | Brown et al. | 285/321 |
| 3,463,228 A * | 8/1969 | Hearn | 166/181 |
| 3,623,753 A * | 11/1971 | Henry | 285/330 |
| 3,829,816 A * | 8/1974 | Barry et al. | 439/191 |
| 4,001,774 A | 1/1977 | Dawson et al. | |
| 4,051,696 A | 10/1977 | Mason et al. | |
| 4,095,865 A | 6/1978 | Denison et al. | |
| 4,099,745 A | 7/1978 | Cobbs | |
| 4,220,381 A | 9/1980 | Van Der Graaf | |
| 4,397,484 A * | 8/1983 | Miller | 285/81 |
| 4,483,393 A | 11/1984 | More et al. | |
| 4,496,203 A | 1/1985 | Meadows | |
| 4,534,585 A | 8/1985 | Saliger | |
| 4,658,895 A * | 4/1987 | Brisco | 166/237 |
| 4,683,944 A | 8/1987 | Curlett | |
| 4,759,601 A | 7/1988 | Knutsen et al. | |
| 4,788,544 A | 11/1988 | Howard | |
| 4,799,544 A | 1/1989 | Curlett | |
| 4,836,305 A | 6/1989 | Curlett | |
| 4,914,433 A | 4/1990 | Galle | |
| 4,915,423 A | 4/1990 | Wallace | |
| 4,976,655 A | 12/1990 | Hebert, Sr. | |
| 5,048,871 A | 9/1991 | Pfeiffer et al. | |
| 5,306,052 A * | 4/1994 | McGushion | 285/328 |
| 5,474,334 A | 12/1995 | Eppink | |
| 5,563,512 A | 10/1996 | Mumby | |
| 5,609,440 A | 3/1997 | Roche | |
| 5,785,357 A | 7/1998 | Foster et al. | |
| 5,794,985 A | 8/1998 | Mallis | |
| 5,795,169 A * | 8/1998 | Reed | 439/191 |
| 5,950,744 A | 9/1999 | Hughes | |
| 5,984,006 A | 11/1999 | Read et al. | |
| 6,003,606 A | 12/1999 | Moore et al. | |
| 6,015,015 A | 1/2000 | Luft et al. | |
| 6,070,912 A | 6/2000 | Latham | |
| 6,116,658 A | 9/2000 | Bohlen | |
| 6,123,561 A | 9/2000 | Turner et al. | |
| 6,168,213 B1 | 1/2001 | Muller | |
| 6,186,249 B1 | 2/2001 | Bjornstad | |
| 6,202,743 B1 | 3/2001 | Moore | |
| 6,208,632 B1 * | 3/2001 | Kowalski et al. | 370/335 |
| 6,209,632 B1 | 4/2001 | Holbert et al. | |
| 6,302,797 B1 | 10/2001 | Driver | |
| 6,332,499 B1 | 12/2001 | Kobylinski et al. | |
| 6,557,905 B2 * | 5/2003 | Mack et al. | 285/330 |
| 6,666,274 B2 * | 12/2003 | Hughes | 166/385 |
| 6,764,108 B2 * | 7/2004 | Ernst et al. | 285/333 |
| 2001/0013411 A1 | 8/2001 | Beck et al. | |
| 2001/0030047 A1 | 10/2001 | Chau et al. | |
| 2001/0035288 A1 | 11/2001 | Brockman et al. | |
| 2001/0042617 A1 | 11/2001 | Beck et al. | |
| 2002/0000317 A1 | 1/2002 | Rayssiguier et al. | |
| 2002/0005282 A1 | 1/2002 | Holbert et al. | |
| 2002/0014334 A1 | 2/2002 | Chau et al. | |
| 2002/0014336 A1 | 2/2002 | Jones | |
| 2002/0014340 A1 | 2/2002 | Johnson | |
| 2002/0112852 A1 | 8/2002 | Floerke et al. | |
| 2002/0112861 A1 | 8/2002 | Restarick et al. | |

FOREIGN PATENT DOCUMENTS

| WO | WO 92/04525 | 3/1992 |
|---|---|---|

OTHER PUBLICATIONS

Horizontal Systems: Technology for Shallow-Site Remediation, Feb. 1993, Journal of Petroleum Technology.

Smart Drilling with Electrical Drillstring, Feb. 2003, Paul Lurie, Philip Head, Jackie E. Smith.

Composite-lined Tubulars Can Lower Operating Expenses, Jul. 2000, Kenneth Ross.

* cited by examiner

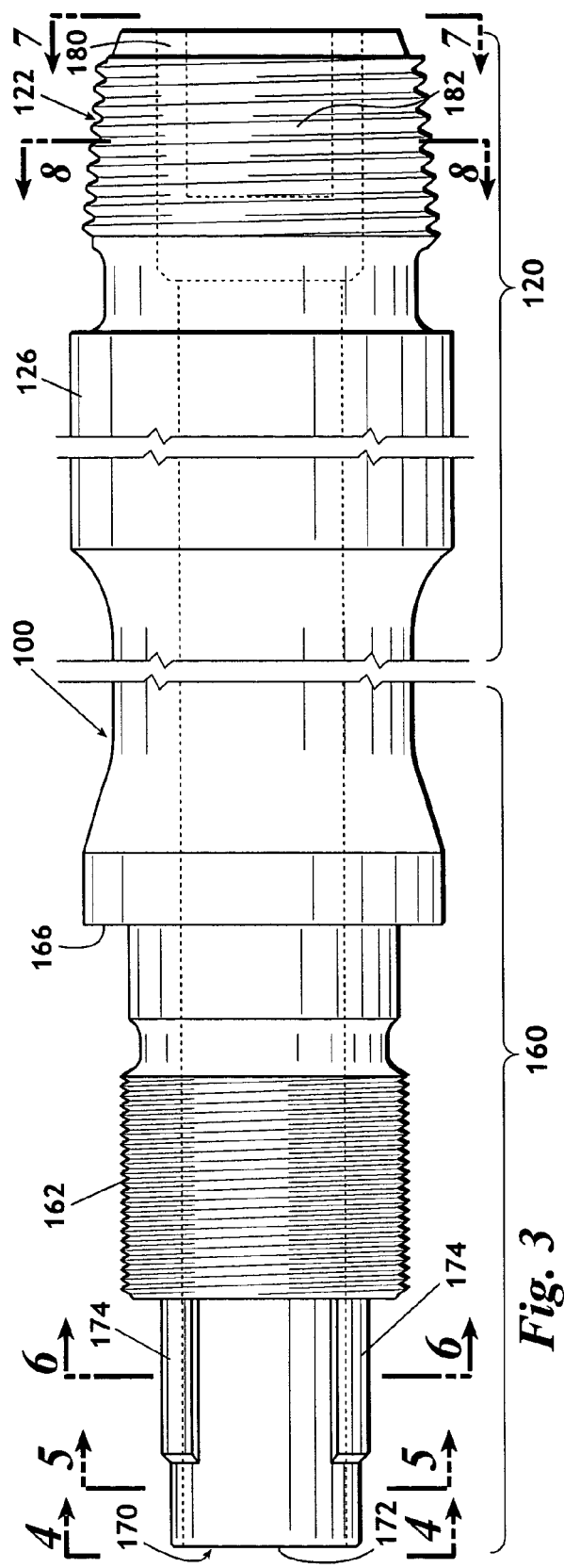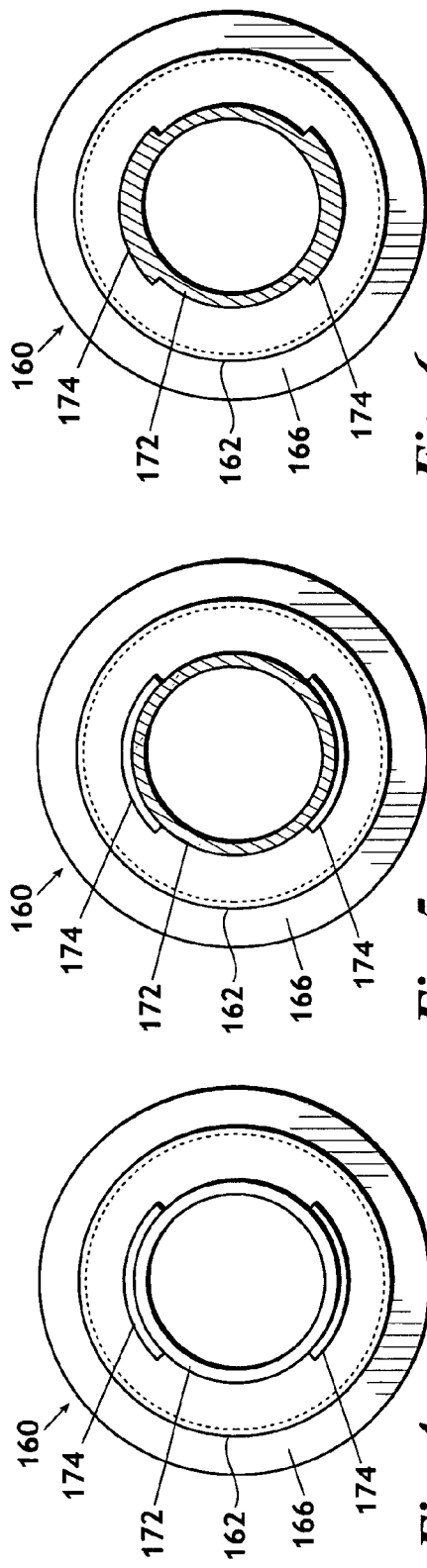

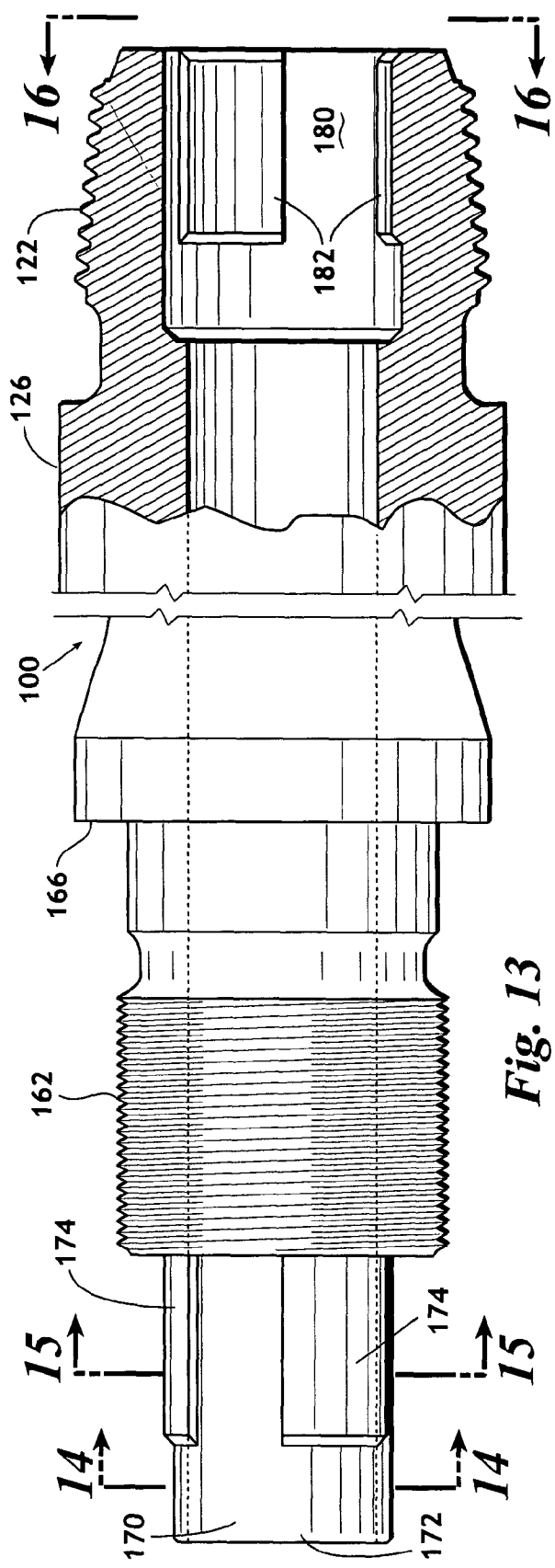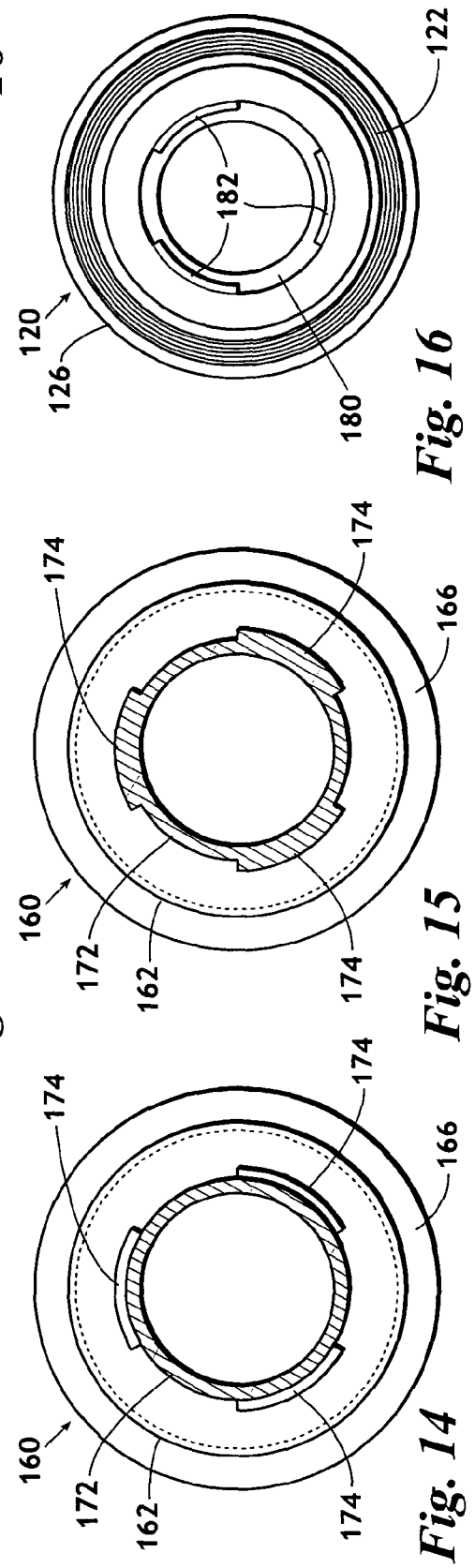
*Fig. 13*
*Fig. 14*
*Fig. 15*
*Fig. 16*

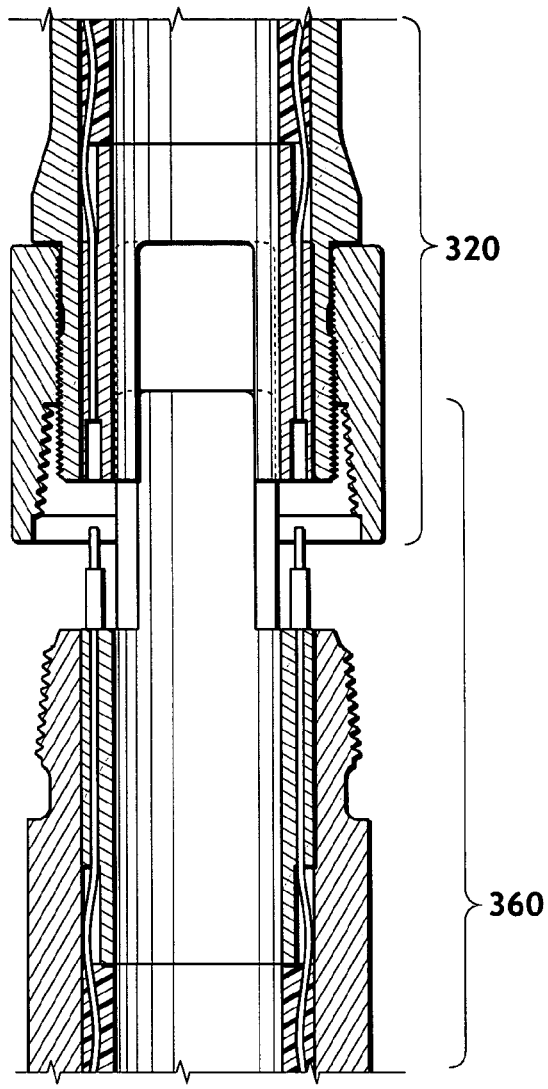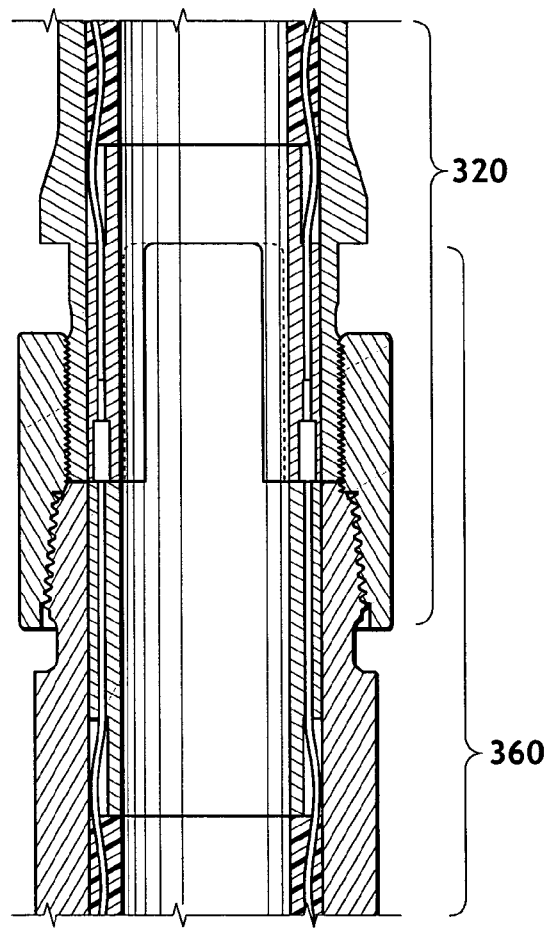
*Fig. 27*        *Fig. 28*

ROD AND TUBING JOINT OF MULTIPLE ORIENTATIONS CONTAINING ELECTRICAL WIRING

CROSS-REFERENCE TO RELATED APPLICATIONS

The present application is a continuation-in-part of application Ser. No. 10/633,471 entitled "Tubing Joint of Multiple Orientations Containing Electrical Wiring" filed on Aug. 1, 2003.

FIELD OF THE INVENTION

The present invention generally relates to a pipe connection for tubing, casing and drill pipe that is used in the drilling process and in the production of hydrocarbons from a subterranean environment, and specifically to a tubing connection for coupling multiple tubing sections in multiple orientations with optional electrical plugs and wiring.

BACKGROUND OF THE INVENTION

Pulling a worn out drill bit on an offshore drilling rig can take several days of continuous labor. The labor involved includes physically disconnecting connections between each of the tubing sections as the tubing is withdrawn until the drill bit is retrieved. The process must then be repeated to reinsert the new drill bit. Any improvement in tubing connections that can reduce the time it takes to disconnect or connect tubing sections can create significant cost savings by reducing the time required to complete the operation and get the new drill bit into operation.

One type of tubing connection is designed so that each tubing section can be connected to the next so that the exact orientation of the drill bit can be known in relation to the above ground tubing. Specifically, U.S. Pat. No. 5,950,744 (the '744 patent) discloses a pipe joint for self-aligning a drill string by means of "at least one downwardly projecting extension and a lower section having a corresponding recess for receiving the extension." In the '744 patent a single downwardly projecting extension may only engage the corresponding recess in one orientation. In the '744 patent, multiple downwardly projecting extensions may also only mate with the corresponding recesses in one orientation because asymmetrical configurations are used for the multiple downwardly projecting extensions in order to ensure that the tubing may be connected in only one orientation.

The '744 patent solved the problem of finding a way to join together individual pieces of pipe, tubing, or casing so that an imaginary reference line will exist down the length of the drill string and, consequently, so that the operators at the surface will know the orientation of the drill bit at the bottom of the well bore. Prior to the invention of the '744 patent it was impossible to determine the orientation of the drill bit in threaded connections because the connection orientation differed from connection to connection depending on the tightness of the threaded connection. Additionally, the '744 patent solved the problem that threaded connections alone limit the rotation of the drill string to one direction. If the rotational direction of a threaded drill string is reversed, then the likelihood that at least one connection in the drill string will unthread is substantially increased. The splined connections comprising outwardly extending projections and corresponding receiving recesses disclosed in the '744 patent solve this problem because the splined connection strengthens the coupling and permits rotation clockwise or counterclockwise.

When a tubing connection can only be made in one orientation, time must be spent in rotating the tubing section to be connected until it aligns in the one position that will allow it to be joined. The amount of time spent in manipulating each tubing section to align it with the tubing section to which it is to be joined can be considerable when hundreds or thousands of connections are being made.

A need exists for an improvement to the '744 patent so that when it is not necessary to know the orientation of the tool at the bottom of the drill string, the pipe joint can permit alignment of the tubing sections in more than one orientation. Allowing alignment in more than one orientation will permit faster joining of the tubing sections and increase the strength of the coupling by increasing the number of splines.

A need related to connecting tubing sections in multiple orientations using splined connections, is the need to transmit electricity downhole to power electrical motors and other downhole devices such a choke. The downhole devices may be located at some point along the drill or tubing string, or they may be located at the end of the string of pipe. The need to transmit electricity is significant when using an electrical submersible pump (ESP) in an artificial lift method. A need also exists to transmit data from downhole sensors to surface operations through internally mounted wires in drilling operations and in production operations.

Basic artificial lift methods of producing oil and water from a well have improved and changed in recent years. Nearly all artificial lift methods still connect a plurality of pipes to form a conduit within a well that has been drilled and cased to allow oil and water to be pumped from the bottom of the well to production tanks at the surface. The production string usually has a pumping device at its lower end that is positioned near the bottom of the well bore that has been prepared for production. Pumping mechanisms such as electrical submersible pumps (ESP) and progressive cavity pumps (PCP) provide the energy needed to bring fluids to the surface through a string of jointed tubing. These pumps normally require an electric motor to function. Although many improvements have been made to these pumps over the years, there has been little done to reposition the wires that provide power to the pump from the outside of the tubing to the inside of the tubing.

For various reasons, those who are skilled in the science of producing fluids from a well have sought out a reliable method of supplying power to the bottom of a well bore. The previously proposed solutions to this problem have been unreliable, expensive, and complicated to install and remove. For example, the currently preferred power transmission method is to use bands to secure a cable that contains one or more wires to the outside of the production string of tubing. The bands keep the wire adjacent to the tubing so that it does not snag on the production casing or on any objects that might be in the well bore. The bands also support the cable's weight by securing the cable to the tubing. This method is problematic because it exposes the cable and bands to the corrosive elements of the well bore. Moreover, the odds of band failure increase during the installation (running) and removal (pulling) of the tubing in inclined well bores (the most common type of well bore) because the bands are more likely to hang at the gap where two joints of casing have been connected. Failure of one or more bands can prevent the removal of the pump or tubing because the annular space between the outside of the production tubing and the inside of the production casing is small and the cable, if not secured to the tubing, can wedge between the casing and the tubing causing the tubing to become stuck. Even if the cable does not break, the insulation on the wire inside the cable can be damaged which can create a short in the electrical circuit, rendering the wire essentially useless. The tubing string then has to be pulled back to the surface, and the short found and repaired before the pump can be run back to the bottom of the well bore. The problems created by banded external cables are costly and time consuming, and a reliable and cost effective alternative method of transmitting power from the surface to the bottom of the well bore is needed.

One solution to this problem is to use a plurality of tubing with multiple wires attached to the inside of the tubing instead of the outside of the drill pipe. While this solution alleviates the problem of snagging the wire or the bands, it does not solve the problem of exposing the wire to the harsh environment of the produced fluids that are contained within the production tubing. Simply hanging the cable on the inside of the tubing is also problematic because there is no way to support the cable's weight and the pump's pressure requirements will be higher because of the added friction between the fluid that is being pumped and the rough exterior of the cable.

Another solution to the above stated problem is to concentrically position the wires on the exterior of a tube that is inserted and attached to the actual production tubing itself. This solution avoids the problems presented by simply attaching the wire to either the interior or the exterior of the tubing. An example of this technique can be found in U.S. Pat. No. 4,683,944 (the '944 patent) entitled "Drill Pipes and Casings Utilizing Multi-Conduit Tubulars." The '944 patent discloses a drill pipe with electrical wires positioned inside conduits in the drill pipe wall. But positioning the wire inside the drill pipe wall significantly decreases the overall pipe wall thickness. In order to overcome the decreased wall thickness, significantly thicker drill pipes would have to be used. The multiple conduits also create weak points in the drill pipe between the conduits. The high rotational stress that the drill pipe encounters in the drilling operations can cause stress fractures in the pipe wall between the multiple tubing conduits. In an extreme case, high rotational stress can lead to an internal fracture in the drill pipe that disengages the drill pipe's interior wall from its exterior wall.

Furthermore, manufacturing multiple conduit drill pipe is a complicated process, which is quite unlike the conventional drill pipe manufacturing process. Conventional drill pipe is manufactured by attaching male and female pipe connections to opposite ends of a conventional piece of pipe. The two connections are usually welded to the pipe. Multiple conduit pipes must be either extruded with the multiple conduits in place, or the multiple conduits must be drilled or cut out of a conventional drill pipe. In either case, the costs associated with manufacture of multiple conduit drill pipe are prohibitive.

Another problem encountered in the addition of wires to drill pipe, which is not unique to multiple conduits, is the problem associated with creating reliable, secure electrical connections. In conventional drill pipe, the individual pipe segments screw together, creating a problem for connecting the wires during the screwing or unscrewing process. This problem can be overcome by using drill pipe that plugs together and is secured with a threaded coupler. This type of connection is known in the art. The '944 patent discloses a similar type of coupling connection, but requires a planer conduit seal between the individual pipe segments in order to assure the integrity of the conduit connection. The removable conduit seal is crucial to the method in the '944 patent because a permanently installed conduit seal would be susceptible to damage during manufacture, transportation, storage, and installation of the multiple conduit drill pipe during drilling operations. Installing these conduit seals during the drilling process is also a cumbersome and a time consuming process. Therefore, a need exists for a method of transmitting electrical power to the bottom of a well bore in which the electrical connections are adequately protected from damage and the process of connecting the individual pipe segments is relatively simple and fast.

The prior art has previously attempted to supply power to the bottom of a well bore by alternative delivery methods as well. For example, in SPE/IADC article 798866 (the '866 article) entitled "Smart Drilling with Electric Drillstring™," the authors disclose a method of supplying power to the bottom of a well bore using three separate ring connectors at each end of the tool joint. FIG. 1 is an illustration of the ring connectors 20 on the male end of the tool joint. As seen in FIG. 2, ring connectors 20 on the male end of the tool joint are positioned to mate up with ring connectors 21 in the female end of the tool joint when two pieces of pipe are mated together. Threading the tool joint together seals the electrical connection between the ring connectors. The use of ring connectors has the advantage that the pipe sections can be mated in any orientation. However, ring connectors have the disadvantage that frequent connection, disconnection, exposure, and reconnection of tool joints during the running and pulling process causes mud, dirt, and contaminants to become trapped between the ring connectors, which can cause an electrical short. Furthermore, the method disclosed in the '866 article is not preferable because wire 22, used to transmit power to the bottom of the well bore, makes two right-angle turns 24. Right angle turns 24 are not preferable because right angle turns 24 place excessive stress on wire 22 and substantially increase the likelihood of wire failure. Therefore, a need exits for an improved method of joining pipe together and supplying power to the bottom of a well bore that eliminates the need for ring connectors and that allows wire to run through the pipe in an approximate straight line without the need for any sharp angled turns in the path of wire.

U.S. Pat. No. 6,666,274 (the '274 patent) discloses a section of tubing with coupled end connectors and an insert containing at least one electrical wire. The insert has an outside diameter that is approximately equal to the inside diameter of the improved tubing. The insert also has projections at each end such that when two inserts are placed end to end, the projections will mate up. The insert has at least one groove cut into its side and running the length of the insert. The groove is for the placement of a wire for transmission of power to the well bore or for the placement of a wire for transmission of data from the well bore. The groove is installed down the length of the insert. The groove is deep enough so that when a wire is placed inside the groove, the wire does not project beyond the outside diameter of the insert. The insert may contain as many grooves and wire combinations as are necessary for the particular application. The wire has an electrical connection at each end of the insert. When the inserts are placed end to end, the insert projections line up the electrical connectors and correct mating of the insert projections will result in correct mating of the electrical connectors.

The inserts of the '274 patent are the same length as the tubing and are installed inside the tubing such that the insert is flush with the first end of the tubing. The inserts are then welded to the tubing or secured to the tubing by some other method. A threaded coupler is then installed on the second end of the tubing to protect the exposed insert and electrical connector. The coupler will also be used to secure the improved tubing together. One of the methods disclosed by to '274 patent to solve the problem of aligning the electrical connectors for proper mating is the use of outwardly extending projections on one end and corresponding receiving recesses on the opposite end. (See FIGS. 10 through 14).

Persons skilled in the art are aware of various methods of protecting exposed wires within the tubing. For example, the article "Composite-lined Tubulars Can Lower Operating Expenses," *World Oil*, July 2000, discloses fiberglass epoxylining, internal plastic coating and polyvinyl chloride and polyethylene coating. In the context of oil field applications the article states that "[l]ined tubulars consist mainly of steel tubing with standard oilfield connections lined with composites like glass-reinforced epoxy (GRE) or thermoplastic matrix materials such as high density polyethylene (HDPE) and polyvinyl chloride (PVC)."

As discussed above, a need exists for an improvement to the '744 patent to permit alignment of the tubing sections in more than one orientation. In addition, a need exists for an improvement to the '744 patent to allow the introduction of electrical wiring and connections. A further need exists for an improvement to both the '744 patent and the '274 patent so that the benefits of both inventions can be combined in one improved tool joint that allows connection in multiple orientations where the electrical connectors are in the tool joint itself and not in an insert. The needs identified above exist for production tubing, drill pipe, casing, and/or for any cylindrical pipe used to produce hydrocarbons in a subterranean environment.

SUMMARY OF THE INVENTION

The present invention, which meets the needs stated above, is an apparatus comprising a rod or tubing joint having a plug assembly and a socket assembly. The plug assembly has a plurality of splines and the socket assembly has a plurality of receptacles adapted to receive the plurality of splines. The splines and receptacles are typically disposed on opposite ends of a single rod or tubing section. The number of orientations in which a first rod or tubing joint may be connected to a second rod or tubing joint is equal to the number of splines. The rod or tubing joint further comprises a coupling collar. The coupling collar is threaded onto either the spline or receptacle element so that it may be used to secure the spline and receptacle elements together.

The rod or tubing joint may also have one or more wires for transmitting power and/or data between the surface and the well bore. Each rod or tubing joint may also have a conduit running through a portion of the rod or tubing joint. Wires extend from one rod or tubing joint to the next within the rod or tubing and may be protected by a casing. The casing may be a plastic insert or it may be a suitable coating. When rod or tubing sections are joined with the rod or tubing joint aligned in one of the multiple orientations, the electrical connectors are also properly aligned for correct mating of the electrical connectors. The present invention allows a plurality of casing sections to be connected together in a plurality of distinct orientations.

Individual rod or tubing sections, each having appropriate rod or tubing joints attached, are connected together in a four-step process. To begin, the first end of one rod or tubing section is positioned above the second end of another rod or tubing section. Next, the rod or tubing joint splines are properly aligned with the rod or tubing joint receptacles so that they will mate together. Then, the two rod or tubing sections are plugged together so that the joint splines engage the joint receptacles. Finally, the coupling collar is screwed onto the second rod or tubing section so that the two rod or tubing sections are secured together. The process may be repeated as necessary to create an elongated string of rods or tubing.

BRIEF DESCRIPTION OF DRAWINGS

FIG. 3 is an illustration of the tubing joint in a two-spline configuration.

FIG. 4 is a cross-sectional illustration of the two-spline embodiment taken along line 4-4 in FIG. 3.

FIG. 5 is a cross-sectional illustration of the two-spline embodiment taken along line 5-5 in FIG. 3.

FIG. 6 is a cross-sectional illustration of the two-spline embodiment taken along line 6-6 in FIG. 3.

FIG. 13 is an illustration of the tubing joint in a three-spline configuration.

FIG. 14 is a cross-sectional illustration of the three-spline embodiment taken along line 14-14 in FIG. 13.

FIG. 15 is a cross-sectional illustration of the three-spline embodiment taken along line 15-15 in FIG. 13.

FIG. 16 is a cross-sectional illustration of the three-spline embodiment taken along line 16-16 in FIG. 13.

FIG. 27 is an illustration of the plugging step for the plug section and the socket section of the present invention.

FIG. 28 is an illustration of the securing step for the plug section and the socket section of the present invention.

DETAILED DESCRIPTION OF THE PREFERRED EMBODIMENT

As used herein, the term "cylinder" means a cylindrical apparatus that may be hollow or may be solid. Examples of hollow cylinders are casing, pipe, and tubing. An example of a solid cylinder is a rod.

As used herein, the term "tubing" means production tubing, drill pipe, casing, and/or any other cylindrical pipe that is used to produce hydrocarbons, water, or some other desired product in a subterranean environment and that is adapted to receive the tubing joint described herein.

As used herein, the term "tubing joint" collectively refers to the components of the invention that enable two tubing sections to be secured together, and includes a plug assembly and a socket assembly.

As used herein the term "plug assembly" shall mean a distal end of a section of tubing having a coupling collar and a plurality of splines.

As used herein, the term "rod" shall mean a solid elongated cylinder such as a sucker rod.

As used herein the term "socket assembly" shall mean a distal end of a section of tubing that is adapted to receive a plug assembly.

As used herein the term "spline" means a projection extending outwardly from a first end of a first tubing joint that is adapted for insertion into a receiving recess in the second end of a second tubing joint.

Figure 8:
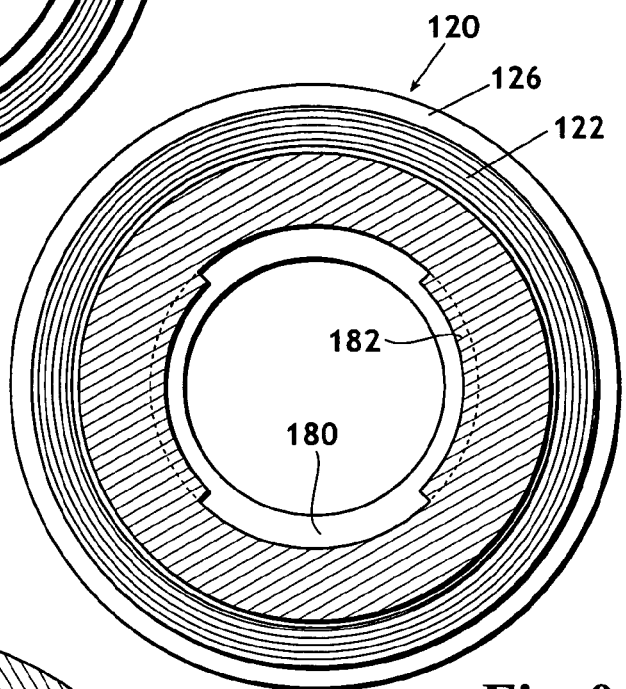
FIG. 8 is a cross-sectional illustration of the two-spline embodiment taken along line 8-8 in FIG. 3.
Figure 9:
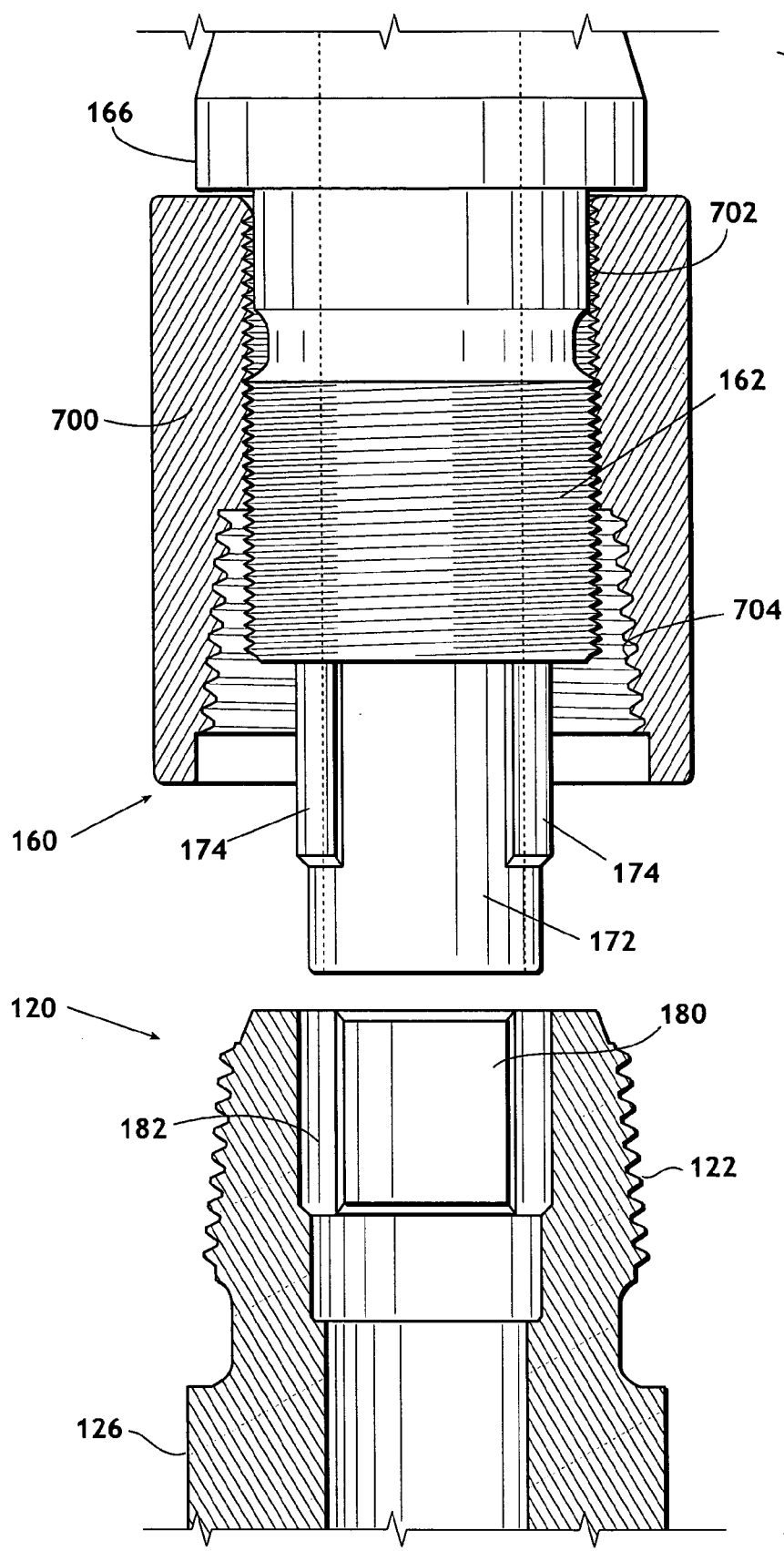
FIG. 9 is an illustration of the positioning and alignment steps for the two-spline embodiment.

FIG. 3 is an illustration of tubing joint 100 without coupling collar 700 (see FIG. 9). Tubing joint 100 comprises socket assembly 120 and plug assembly 160. Socket assembly 120 comprises coarse threads 122, receptacle 180, receptacle spline 182, and wrench grip 126. Plug assembly 160 comprises fine threads 162, spline 170, and coupling stop flange 166. Socket assembly 120 and plug assembly 160 may be like those found in U.S. Pat. No. 5,950,744 (the '744 patent) entitled "Method and Apparatus for Aligning Pipe and Tubing," incorporated herein by reference. Typically, socket assembly 120 and plug assembly 160 are manufactured by either casting or forging. While the preferred method of attaching socket assembly 120 and plug assembly 160 to a piece of tubing is welding, those skilled in the art will be aware of other methods of attaching socket assembly 120 and plug assembly 160 to a piece of tubing. Regardless of the method of manufacture and/or attachment, the inside diameter of socket assembly 120, plug assembly 160, and the tubing are substantially the same. Spline 170 comprises center spline 172 and a plurality of outer splines 174. For simplicity of illustrating the invention, FIGS. 3 through 12A depict an embodiment having two outer splines 174. Embodiments with other spline configurations are illustrated in subsequent figures. The improved tubing shown in FIG. 3 illustrates center spline 172 extending beyond two outer splines 174.

As seen in FIGS. 4, 5, and 6, center spline 172 forms a cylindrical passage that has the same inside diameter as the rest of plug assembly 160, and outer splines 174 are coaxially symmetric around center spline 172. The outer splines 174 may be manufactured as a single uniform member with center spline 172, or manufactured separately and subsequently attached to center spline 172. Additionally, coupling stop flange 166 and fine threads 162 are depicted in FIGS. 4, 5, and 6.

Figure 1:
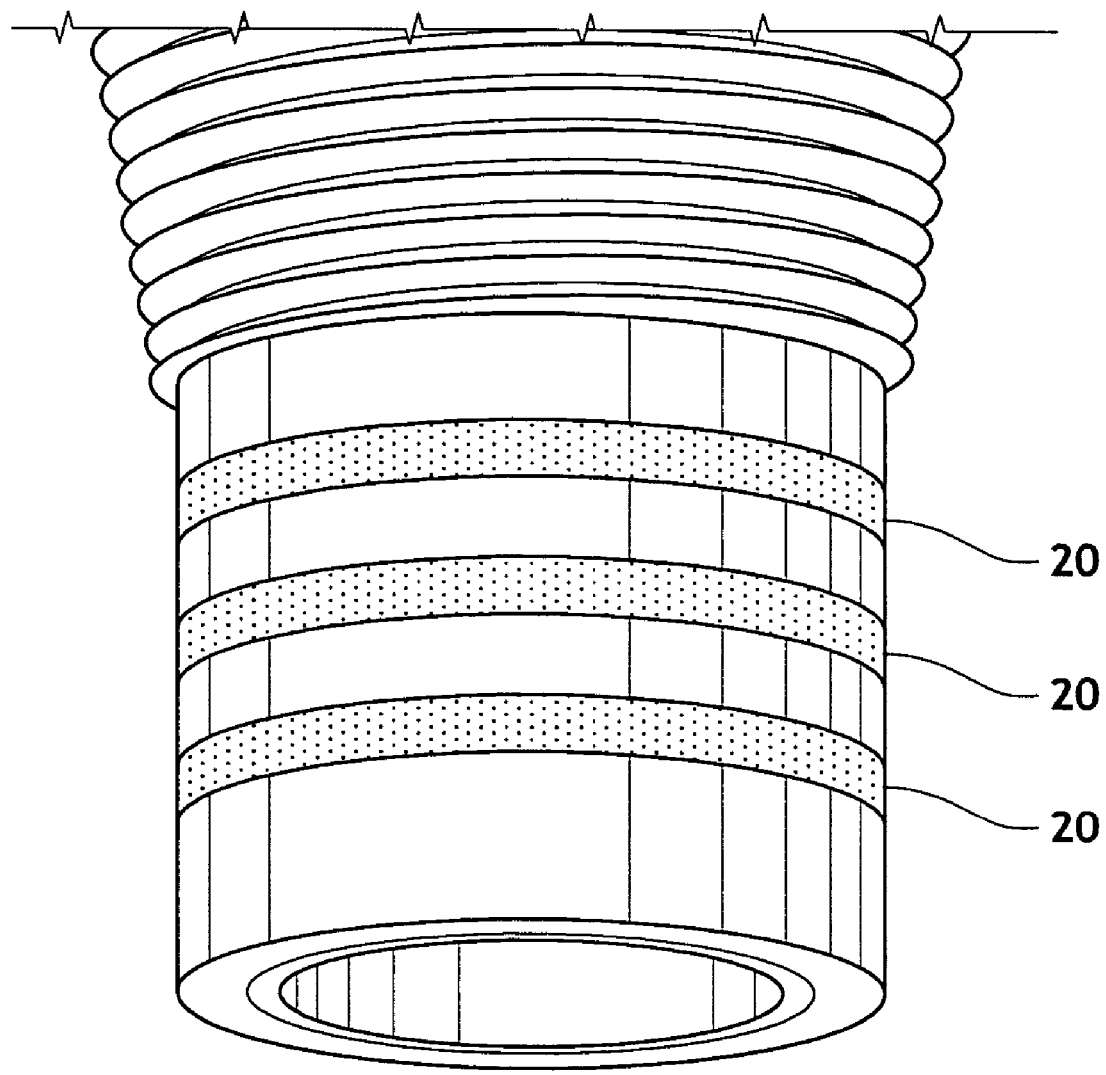
FIG. 1 is an illustration of the prior art ring connectors.
Figure 2:
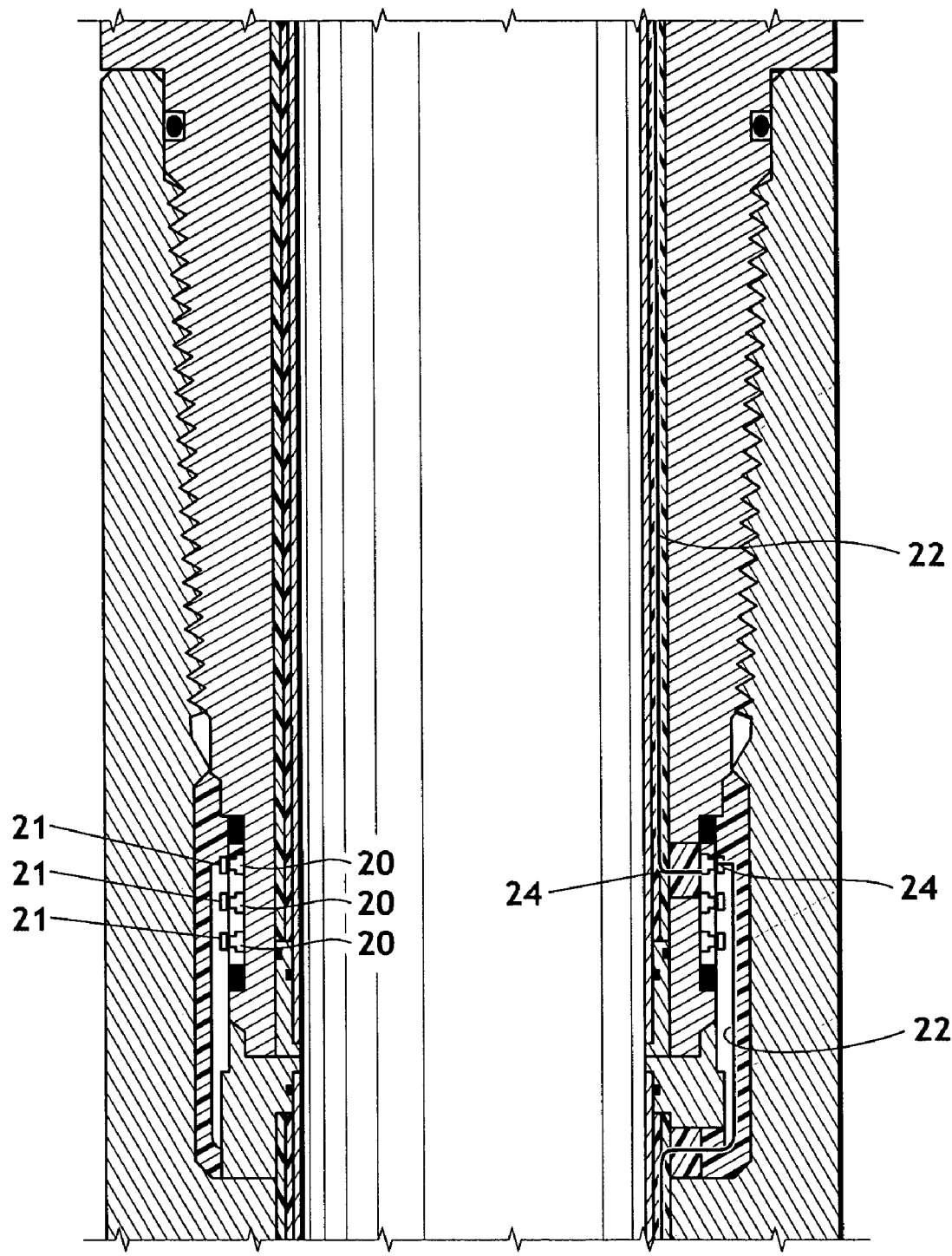
FIG. 2 is an illustration of prior art method of joining two pieces of pipe containing ring connectors.
Figure 7:
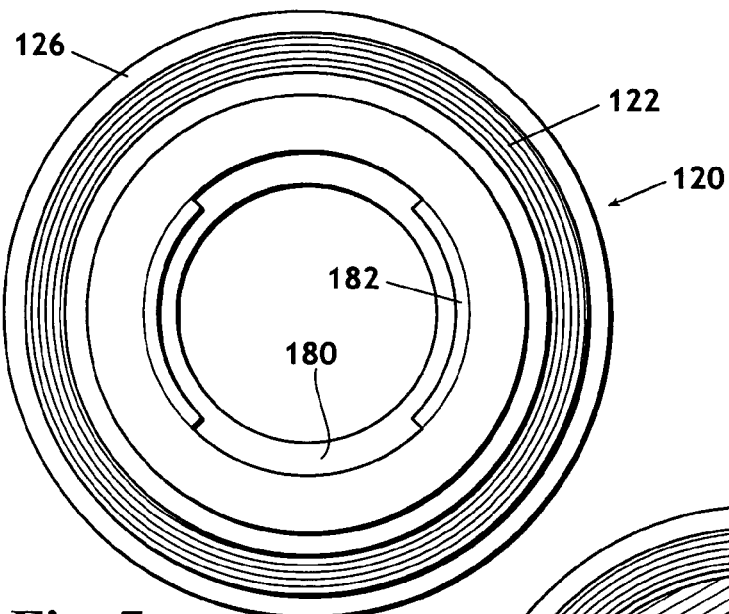
FIG. 7 is a cross-sectional illustration of the two-spline embodiment taken along line 7-7 in FIG. 3.

FIGS. 7 and 8 illustrate receptacle 180 located within socket assembly 120. Much like spline 170, receptacle 180 forms a cylindrical passage having the same inside diameter as the inside wall of socket assembly 120. The cavity created by receptacle 180 and receptacle spline 182 is shaped such that center spline 172 (not shown in FIGS. 7 and 8) and outer spline 174 (not shown in FIGS. 7 and 8) will intermesh with receptacle 180 and receptacle spline 182 when plug assembly 160 (not shown in FIGS. 7 and 8) and socket assembly 120 are plugged together. Additionally, coarse threads 122 and wrench grip 126 can be seen in FIGS. 7 and 8.

Turning to FIG. 9, coupling collar 700 is seen installed on plug assembly 160 prior to engaging plug assembly 160 with socket assembly 120. Coupling collar 700 is annular in shape and contains coupling fine threads 702 and coupling coarse threads 704. Coupling fine threads 702 are configured for screwing engagement with fine threads 162. Coupling coarse threads 704 are configured for screwing engagement with coarse threads 122. Coupling collar 700 can only mate up with tubing joint 100 in one orientation because the pitch of coarse threads 122 and fine threads 162 are different. In other words, coupling collar 700 cannot be removed from tubing joint 100, inverted, and replaced onto tubing joint 100. Similarly, when engaging coupling fine threads 702 and coupling coarse threads 704 with coarse threads 122 and fine threads 162, coarse threads 122 and fine threads 162 do not interfere with the threading process of each other. As seen in FIGS. 4 through 6 coupling stop flange 166 has a larger cross-sectional area than fine threads 162 and acts as a stop for coupling collar 700 so that coupling collar 700 does not go past plug assembly 160. The outside diameter of coupling collar 700 is sufficiently similar to wrench grip 126 so that when the user is securing socket assembly 120 and plug assembly 160 together, a pipe wrench will fit onto both wrench grip 126 and coupling collar 700 without undue adjustment of the pipe wrench. Coarse threads 122 and coupling coarse threads 704 are tapered so that they may be completely engaged with a minimal amount of rotation after socket assembly 120 and plug assembly 160 have been mated. FIG. 9 is representative of how plug assembly 160 will be stored, transported, and handled.

FIG. 9 also illustrates the relative positioning of plug assembly 160 and socket assembly 120 before engaging tubing joint 100. Plug assembly 160 may be vertically positioned above socket assembly 120, as seen in FIG. 9, or vice-versa. Tubing joint 100 may also be connected in the horizontal, but the preferred embodiment is to place plug assembly 160 above socket assembly 120. Proper positioning occurs when center spline 172 is coaxially aligned with receptacle 180.

FIG. 9 is similarly illustrative of the proper alignment between plug assembly 160 and socket assembly 120 before engaging tubing joint 100. Plug assembly 160 and socket assembly 120 are properly aligned by rotating one or both assemblies of tubing joint 100 such that outer splines 174 are properly aligned with receptacle spline 182. Because outer splines 174 and receptacle spline 182 are coaxially symmetric and all have the same dimensions, proper alignment can be achieved in a plurality of orientations, wherein the number of orientations depends on the number of outer splines 174. A person of ordinary skill in the art will appreciate that creating asymmetric splines will yield only one orientation.

Figure 10:
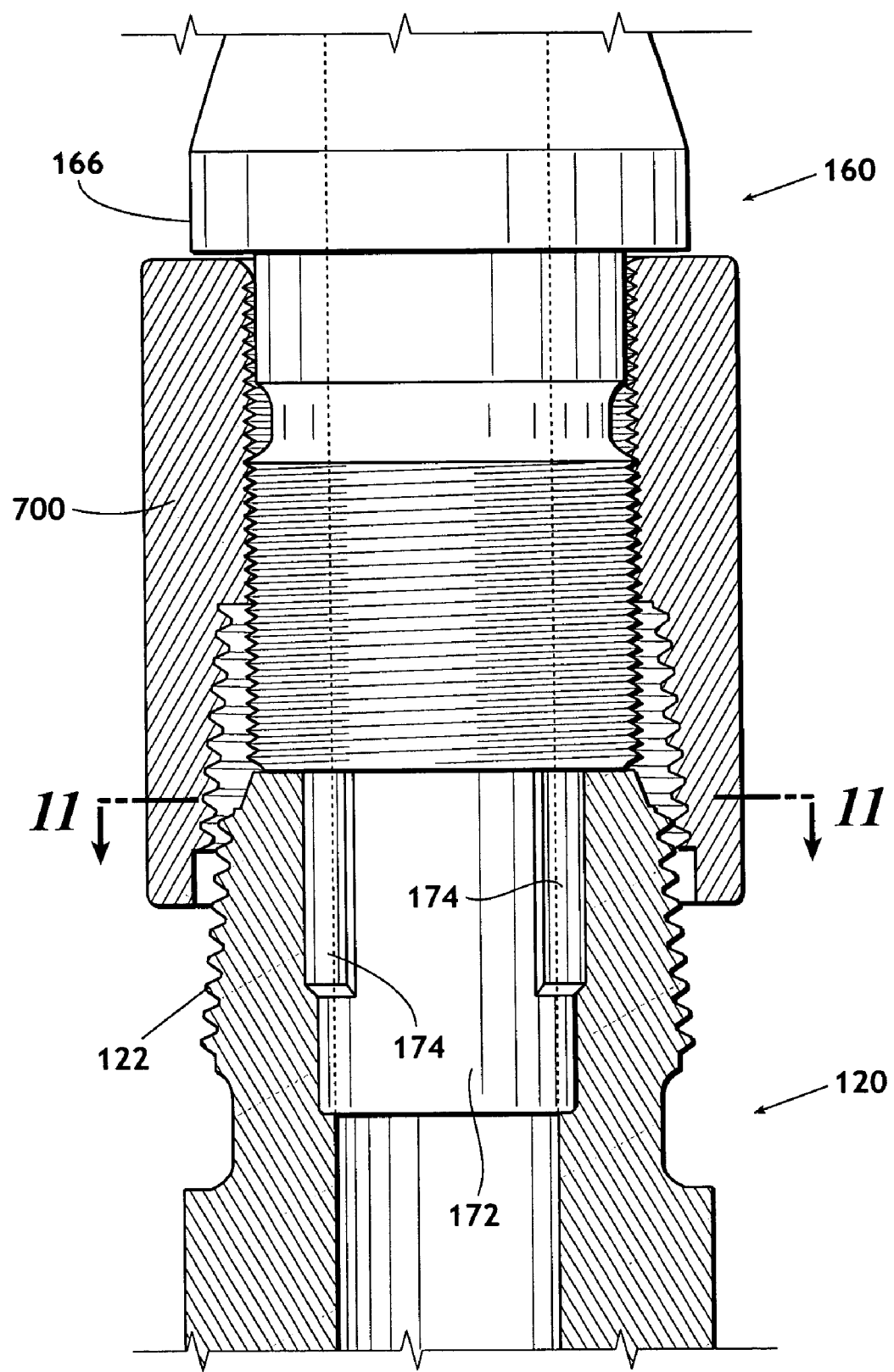
FIG. 10 is an illustration of the plugging step for the two-spline embodiment.

When plug assembly 160 and socket assembly 120 are properly aligned, plug assembly 160 may be inserted into socket assembly 120. FIG. 10 is an illustration of the engaging step in which plug assembly 160 is inserted into socket assembly 120 to complete tubing joint 100. In the engaging step, plug assembly 160 is lowered onto socket assembly 120 such that center spline 172 properly mates with receptacle 180. Similarly, in the engaging step, outer spline 174 intermeshes with receptacle spline 182 (not shown in FIG. 10). Coupling collar 700 is backed onto coupling stop flange 166 so that coupling collar 700 does not engage coarse threads 122 in the engaging step described in FIG. 10.

Figure 11:
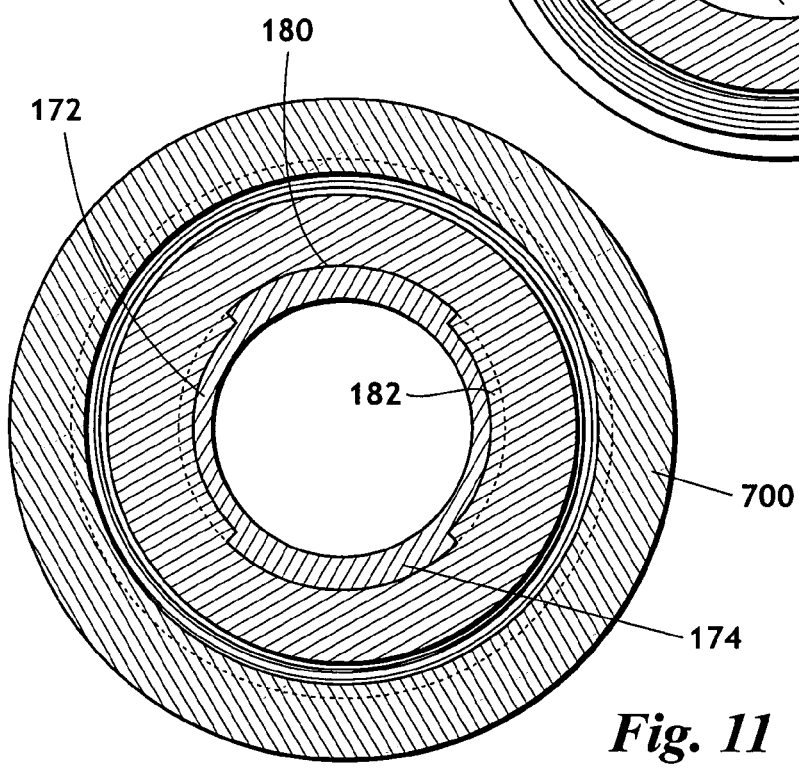
FIG. 11 is a cross-sectional illustration of the two-spline embodiment taken along line 11-11 in FIG. 10.

As illustrated in FIG. 11, center spline 172 is properly mated with receptacle 180 when center spline 172 and outer splines 174 intermesh with receptacle 180 and receptacle spline 182. Coupling collar 700 then can be lowered onto receptacle assembly 120 (not shown in FIG. 9).

Figure 12:
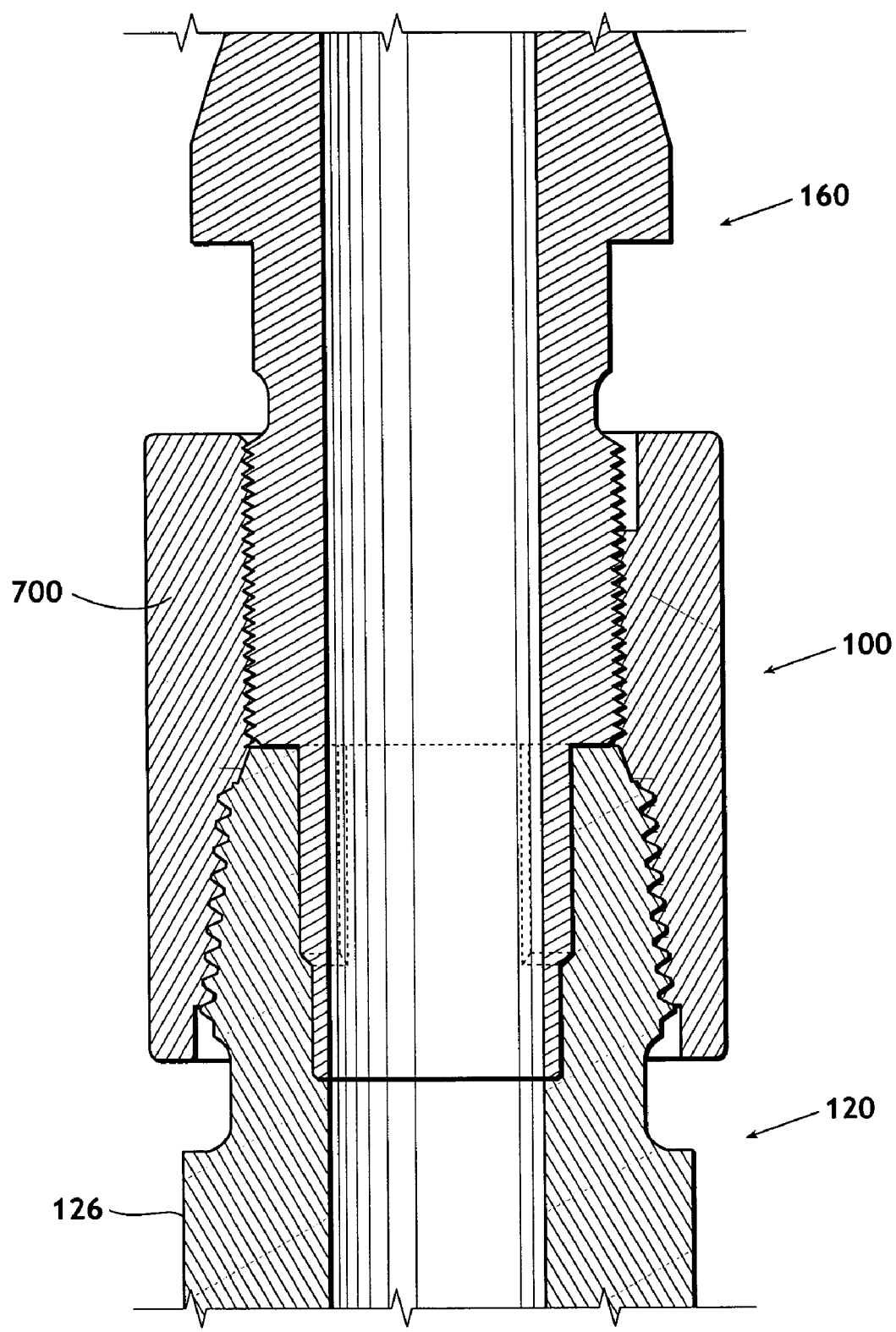
FIG. 12 is an illustration of the securing step for the two-spline embodiment.

FIG. 12 is an illustration of tubing joint 100 secured with coupling collar 700. After plug assembly 160 and socket assembly 120 are properly mated, they are secured together by screwing coupling collar 700 onto socket assembly 120. Coupling collar 700 is secured to socket assembly 120 with pipe wrenches (not shown) that grip coupling collar 700, wrench grip 126 and torque coupling collar 700 until coupling collar 700 is firmly screwed onto socket assembly 120. The two tubing sections that are joined by tubing joint 100 may then be used in the production process.

Figure 12A:
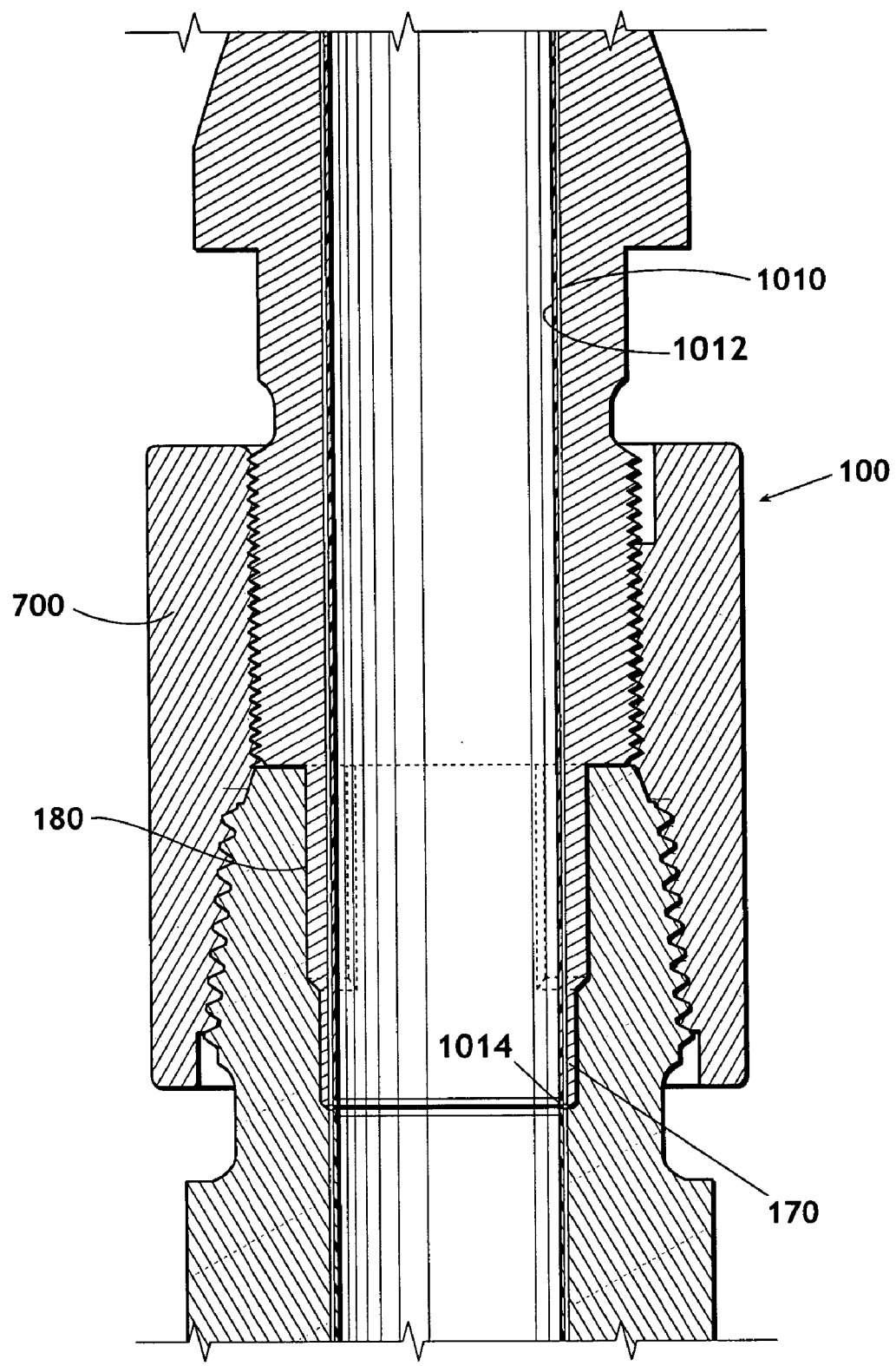
FIG. 12A is an illustration of the securing step for an embodiment of the tubing joint have two splines and connected electrical conductors.

FIG. 12A illustrates an embodiment of tubing joint 100 that further comprises conduit 1010 that may contain conductors. Conductors may be wires, electrically conductive material, or material capable of transmitting optical signals. Examples of conduit 1010 are illustrated in U.S. Pat. No. 6,666,274 entitled "Tubing Containing Electrical Wiring Insert," incorporated herein by reference. Conduits 1010 may be formed by inserting a plastic tube with one or more grooves to conductors in a groove between the plastic tube and the tubing. Alternatively, conduits 1010 may be formed by running a conductor through the tubing and coating the conductor with a suitable coating such as plastic, glass-reinforced epoxy (GRE), or thermoplastic matrix materials such as high density polyethylene (HDPE) and polyvinyl chloride (PVC) As shown in FIG. 12A, alignment and continuity of conduits 1010 is ensured by proper orientation and mating of spline 170 with receptacle 180 and by securing tubing joint 100 with coupling collar 700. Connection 1014 represents a contact connection. A person of ordinary skill in the art will recognize tat many types of connectors are available for assuring a proper electrical or optical connection between socket assembly 120 and plug assembly 160, and will be able to select the appropriate type. A more preferable way to connect the conductors will be discussed in FIG. 22 through 28.

Figure 17:
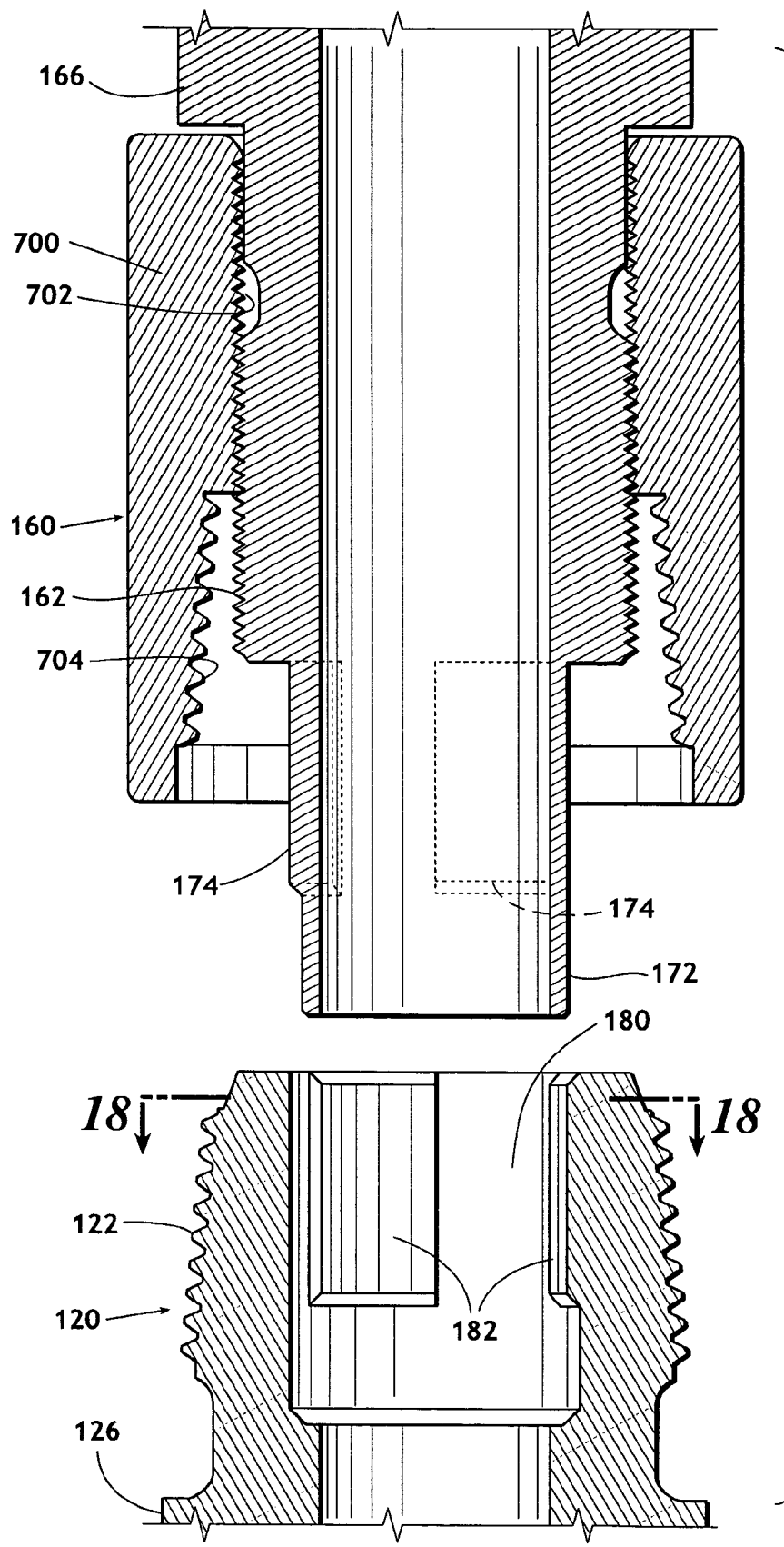
FIG. 17 is an illustration of the positioning and alignment steps for the three-spline embodiment.
Figure 18:
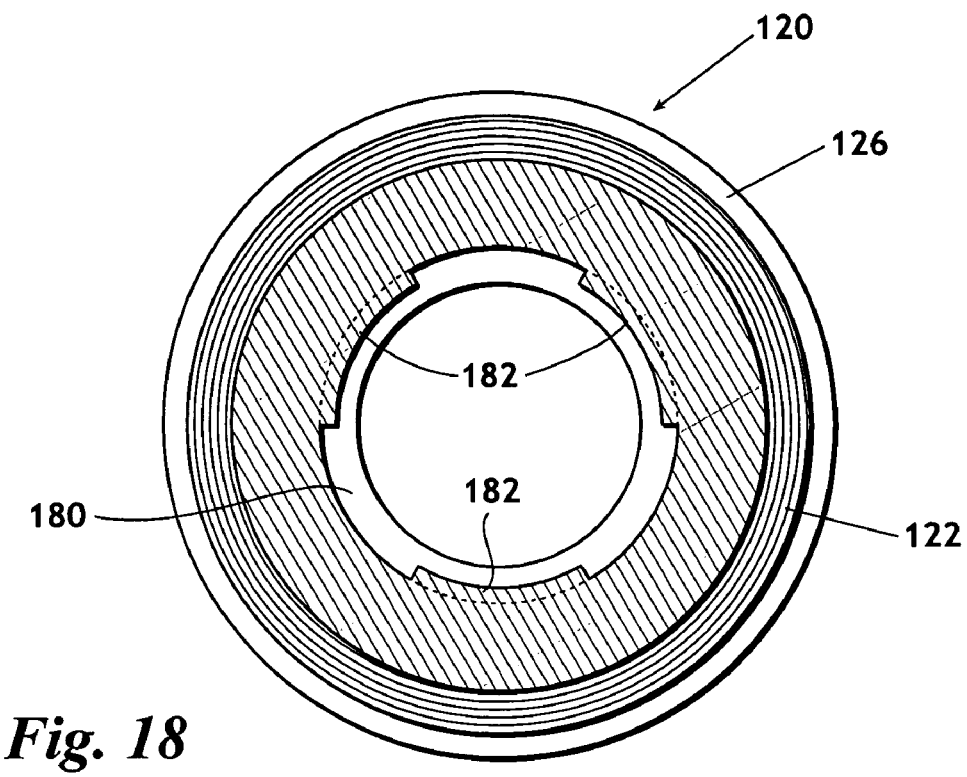
FIG. 18 is a cross-sectional illustration of the three-spline embodiment taken along line 18-18 in FIG. 17.
Figure 20:
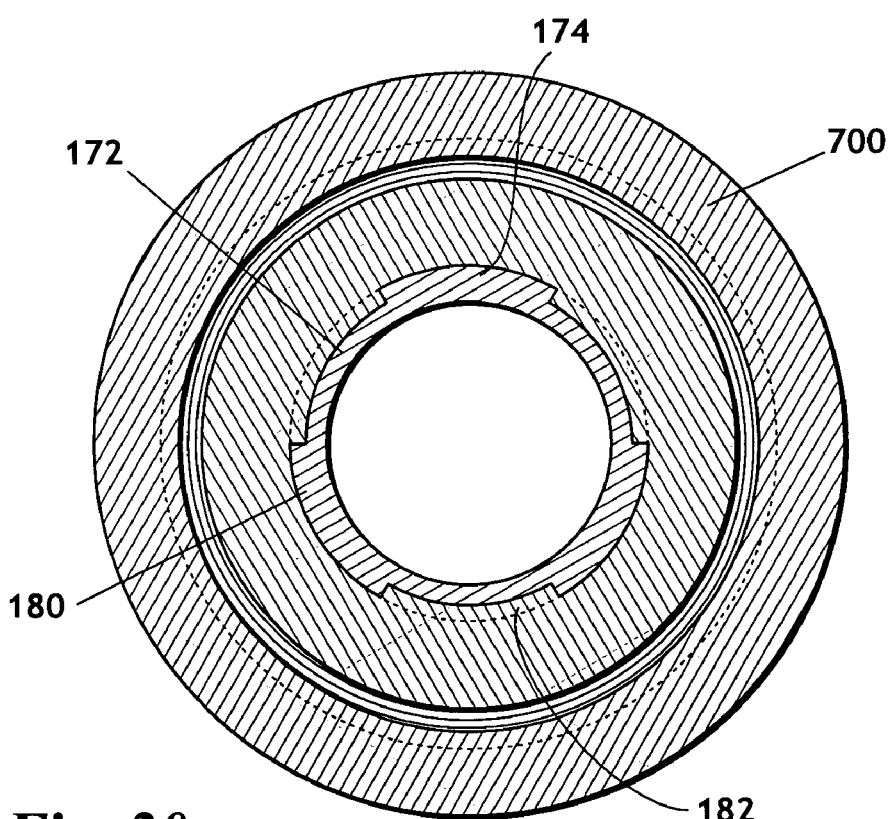
FIG. 20 is a cross-sectional illustration of the three-spline embodiment taken along line 20-20 in FIG. 19.
Figure 19:
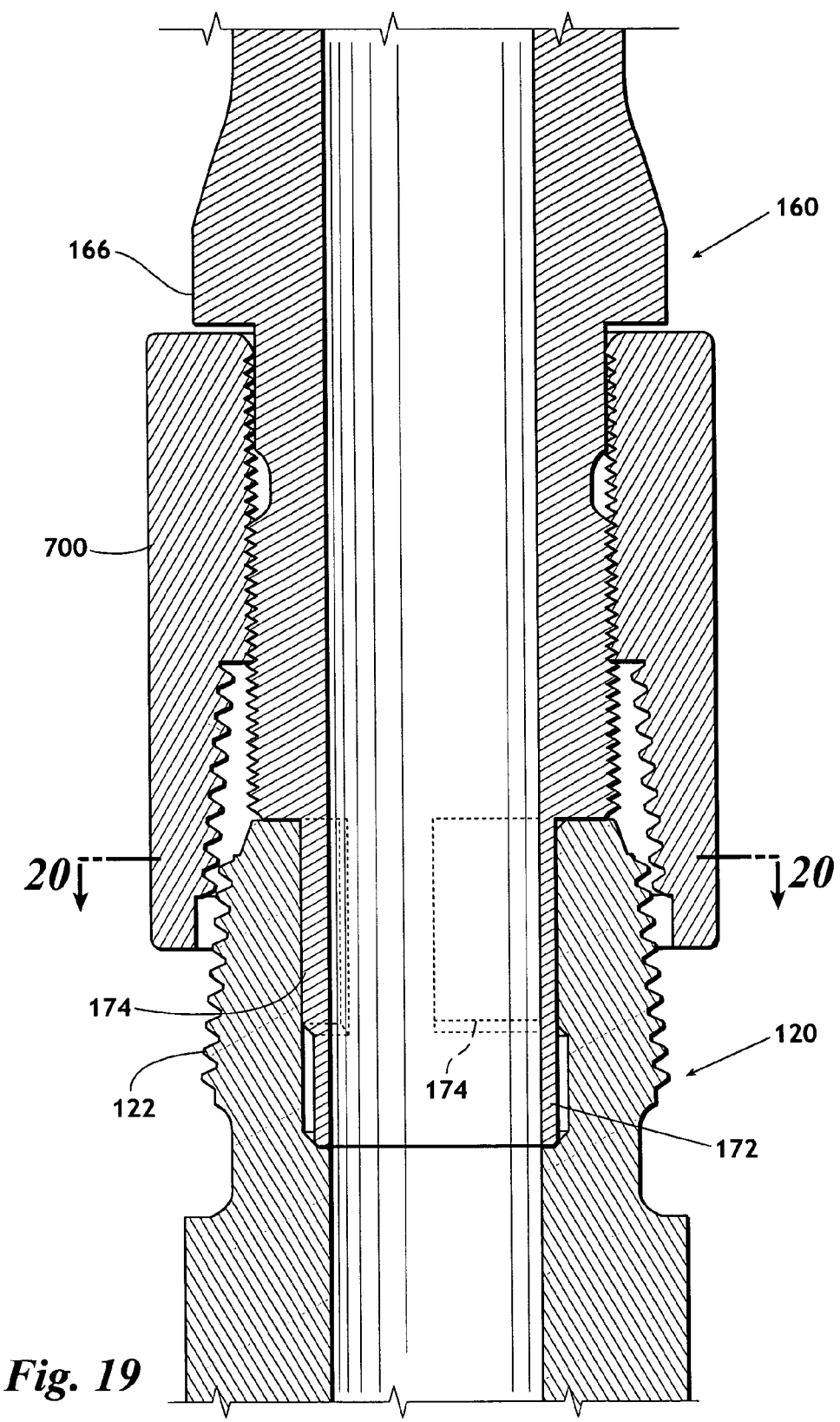
FIG. 19 is an illustration of the plugging step for the three-spline embodiment.
Figure 21:
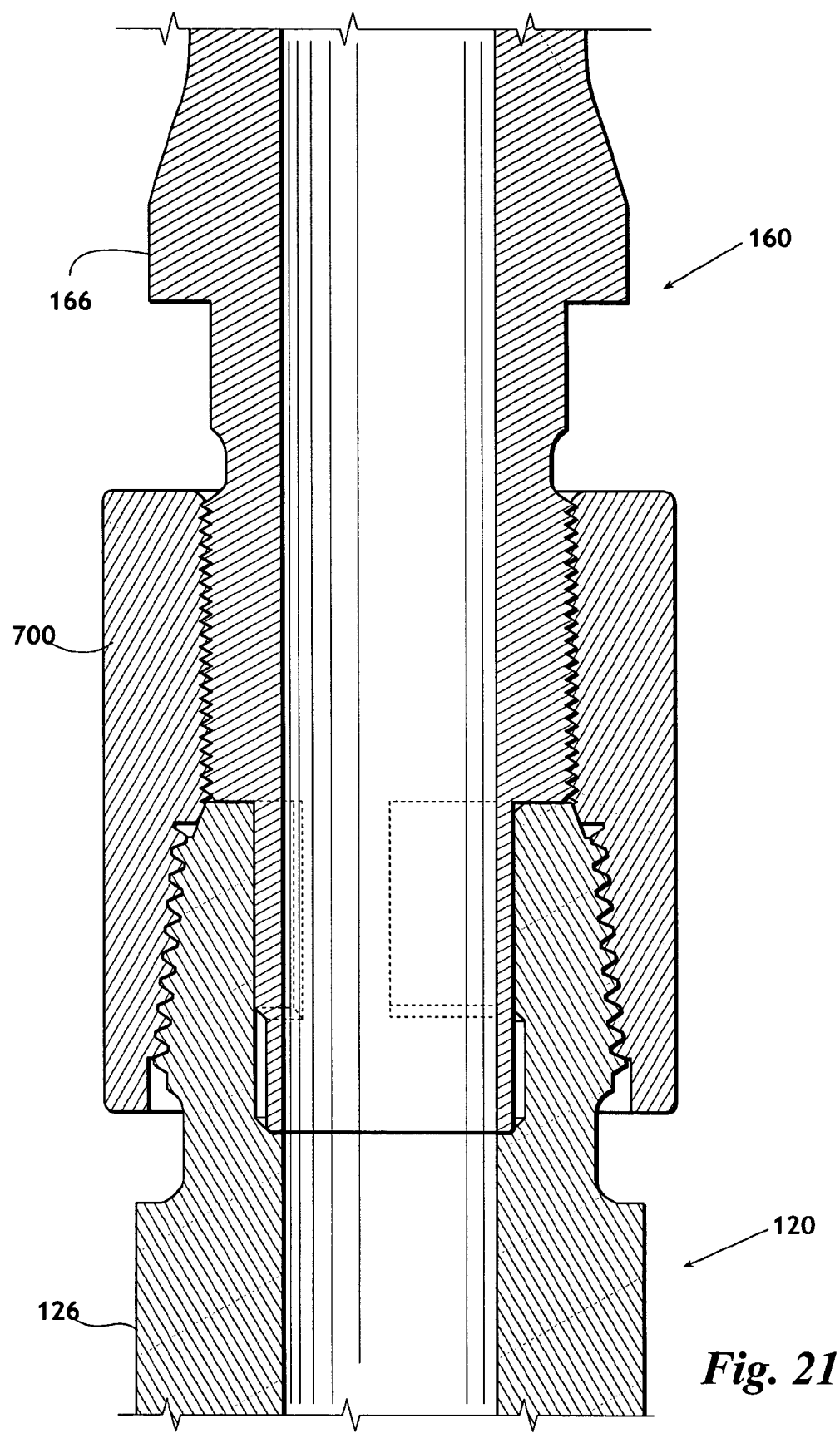
FIG. 21 is an illustration of the securing step for the three-spline embodiment.

FIG. 13 through FIG. 21 illustrate a three-spline embodiment. The manufacture of the three-spline embodiment is similar to the manufacture of the two-spline embodiment. Likewise, assembling a plurality of tubing sections using a three-spline tubing joint is similar to assembling a plurality of tubing sections using a two-spline tubing joint. FIG. 17 is an illustration of the alignment step for a three-spline configuration, in which coupling collar 700 is installed on plug assembly 160. FIG. 19 illustrates the engaging step for the three-spline configuration, and FIG. 21 illustrates the securing step for the three-spline configuration.

Figure 21A:
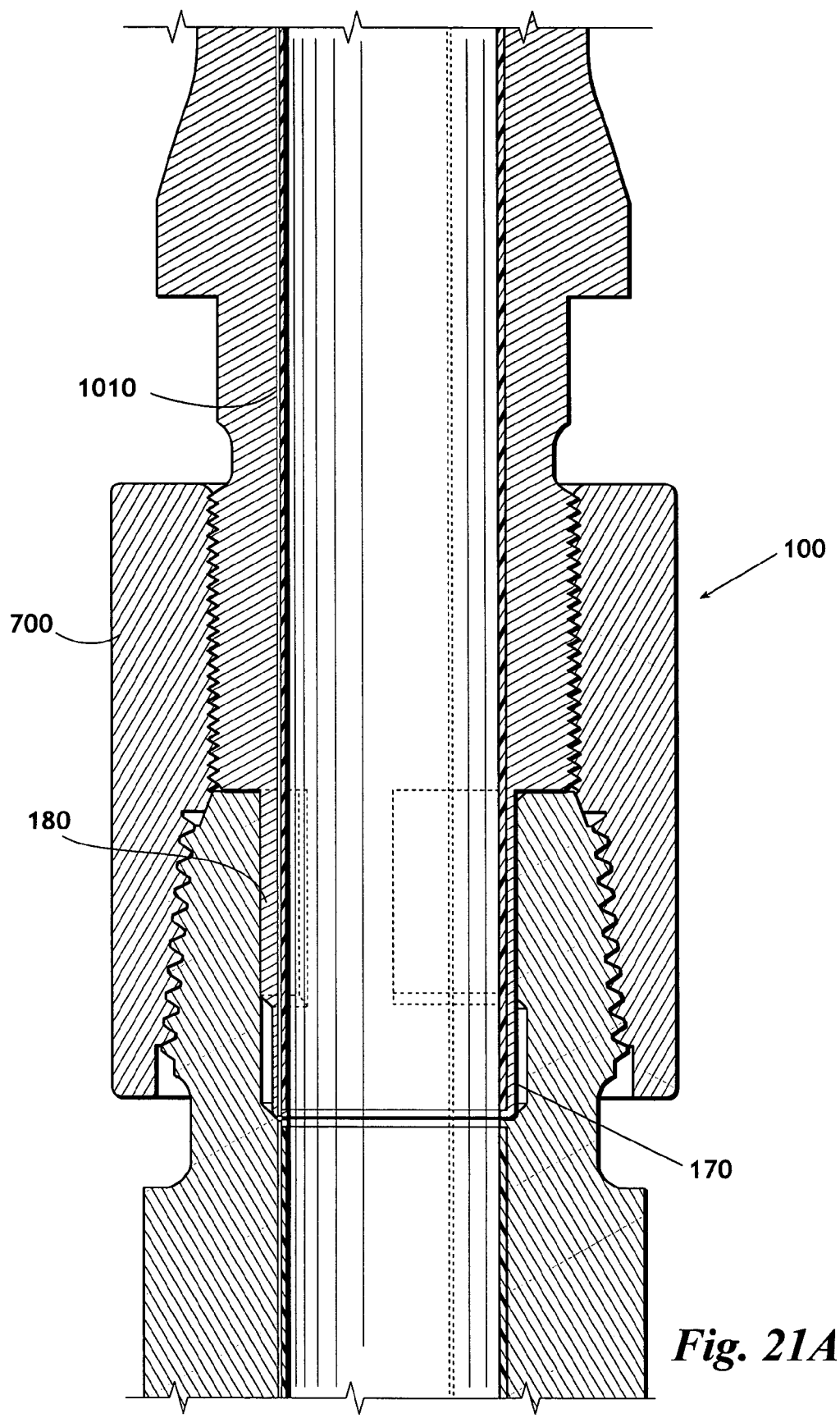
FIG. 21A is an illustration of the securing step for an embodiment of the tubing joint having three splines and connected electrical conductors.
Figure 22:
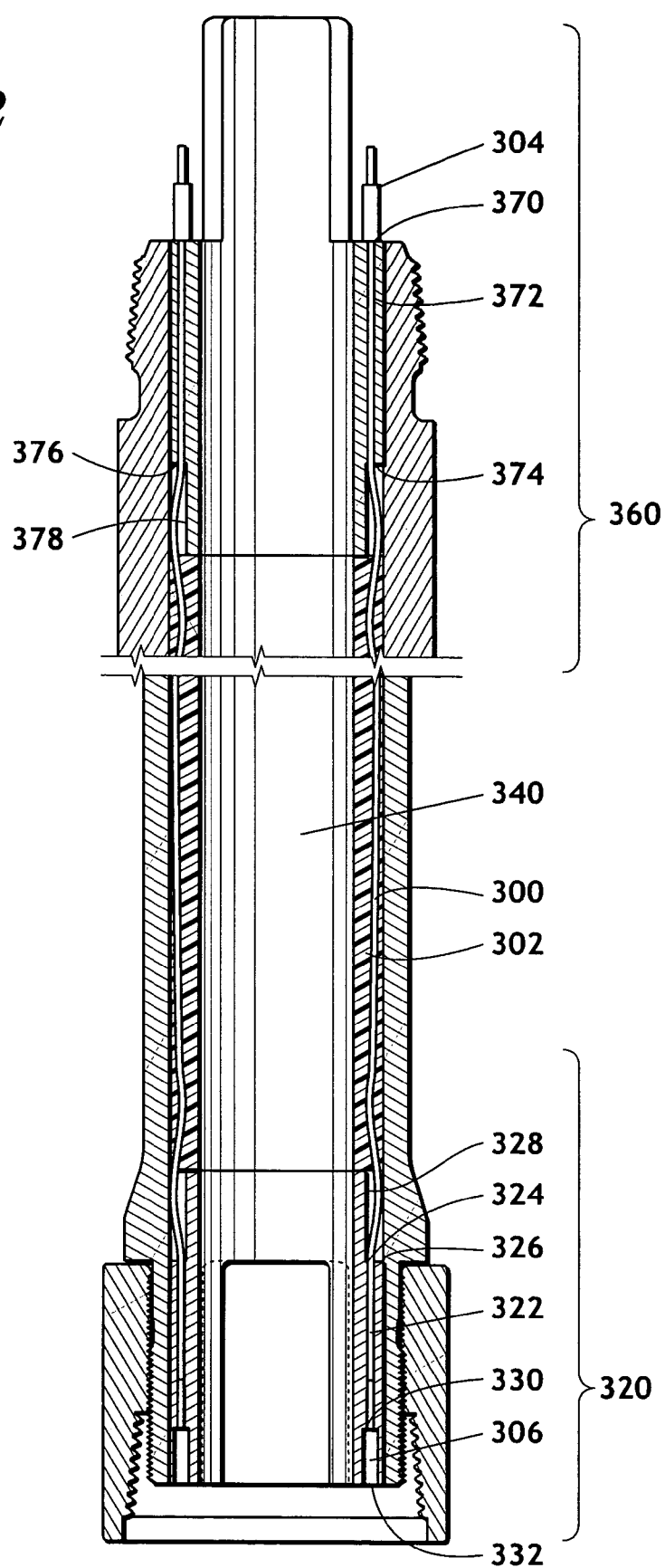
FIG. 22 is an illustration of the casing of the present invention with wires and wire connectors.

FIG. 21A illustrates a three-spline configuration of tubing joint 100 that further comprises conduits 1010, similar to FIG. 12A.

A further advantage of the present invention is that the splines depicted herein allow a plurality of casing sections to be connected together in multiple distinct orientations. These distinct orientations can be described by the amount of rotation required for one casing section to connect with another casing section when one of the casing sections remains stationary. For example, in the two spline embodiment, two casing sections can be connected together in two orientations: 0 degrees and 180 degrees. In the three spline embodiment, two casing sections can be connected together in three orientations: 0 degrees, 120 degrees, and 240 degrees. Similarly, the present invention can be applied to any number of splines desired by the user.

FIGS. 22 through 28 illustrates a further embodiment of the present invention in which tubing joint 100 has been adapted for the passage and connection of wire 300. Alternate plug assembly 360 has conduit 372 adapted for passage of wire 300. Conduit 372 has outside aperture 370 and inside aperture 374. Connector 304 is affixed to alternate plug assembly 360 at outside aperture 370 forming a seal between connector 304 and alternate plug assembly 360. Alternate plug assembly 360 has reduced outside diameter section 378 that creates interior lip 376 allowing wire 300 to exit inside aperture 374 and pass through into the casing interior. Alternate socket assembly 320 has conduit 322 adapted for passage of wire 300. Conduit 322 has outside aperture 330 and inside aperture 324. Recess 306 is adapted for receiving connector 304 through alternate socket assembly aperture 332. Alternate socket assembly 320 has reduced outside diameter section 328 that creates interior lip 326 allowing wire 300 to exit inside aperture 324 and pass through into casing interior 340 and be coated with coating 302. Coating 302 may be plastic, glass-reinforced epoxy (GRE), or thermoplastic matrix materials such as high density polyethylene (HDPE) and polyvinyl chloride (PVC). Moreover, coating 302 may be any suitable material known to persons skilled in the art.

Figure 23:
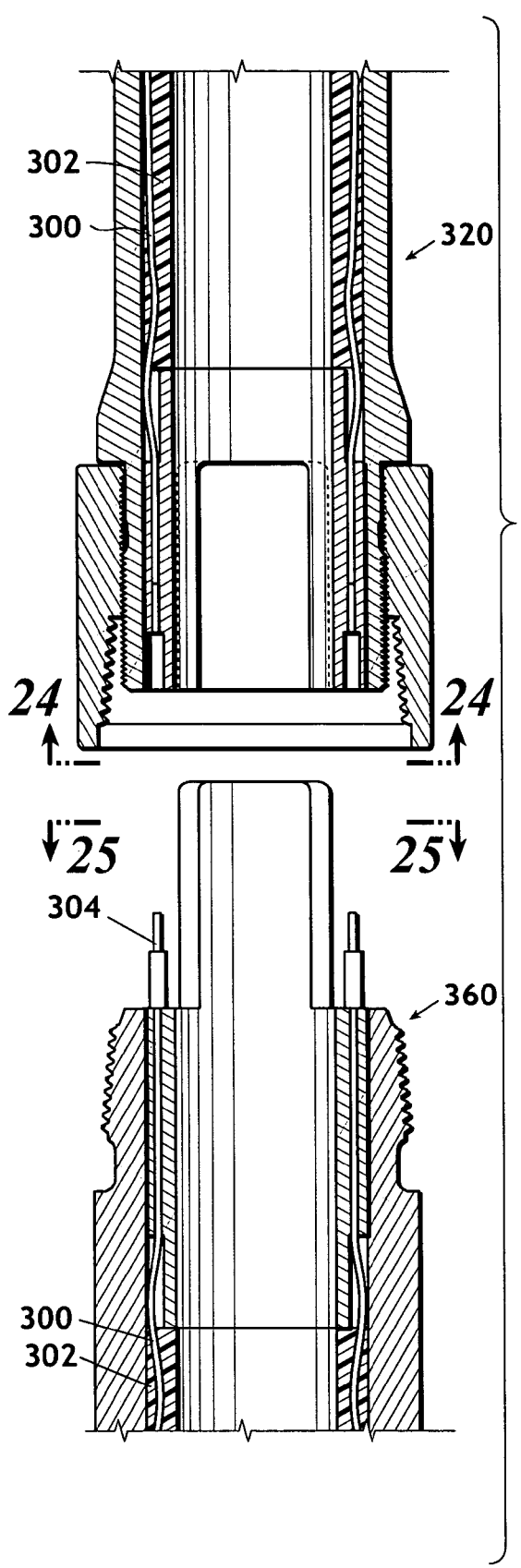
FIG. 23 is an illustration of the aligning step for the plug section and the socket section of the present invention.
Figure 24:
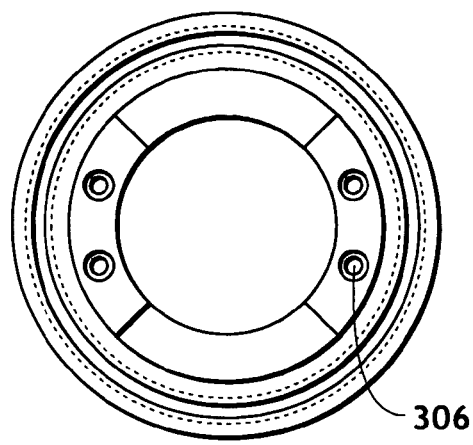
FIG. 24 is an illustration of the splines and wire connectors of the present invention taken along line 24-24 in FIG. 23
Figure 25:
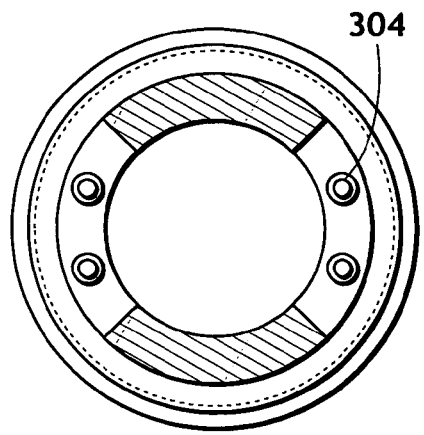
FIG. 25 is an illustration of the splines and wire connectors of the present invention taken along line 25-25 in FIG. 23
Figure 26:
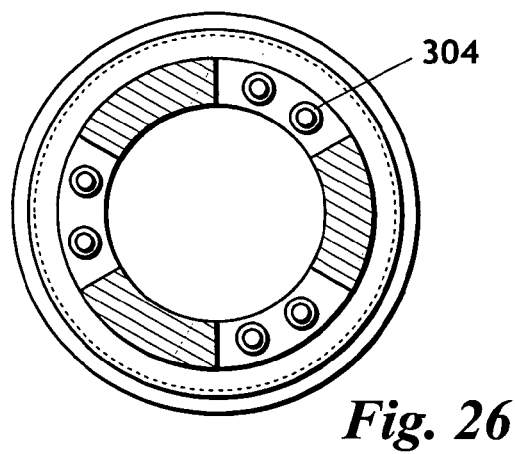
FIG. 26 is an illustration of the three spline embodiment with wire connectors of the present invention.

Wire 300 should be installed so that the length of wire 300 within the casing interior is longer than the distance between alternate plug assembly inside aperture 374 and alternate socket assembly interior aperture 324. The extra wire length allows for flexing of the casing and for expansion of the casing due to heat. Wire 300 may be encased in epoxy or some similar adhesive used to affix wire 300 to the casing interior. Alternatively, a cylindrical conduit containing wire 300 can be used and adhered to the inner wall of the casing. In other alternative embodiments, non-cylindrical conduits can be used to adhere wire 300 to the inner wall of the casing. Wire 300 contains connector 304 and connector 306 which plug together when a plurality of casing sections are secured together, as seen in FIG. 23. The present invention may include a plurality of wires 300, connectors 304, and connectors 306 within a single spline/receptacle of the plug/socket assembly depicted herein. FIGS. 24-26 illustrate different wire configurations within the present invention. A person of ordinary skill in the art will be able to create additional wire configurations other than those depicted in FIGS. 24 though 26. As seen in FIGS. 27 and 28, the present embodiment of the present invention may be aligned, plugged, and secured together with a coupling collar in the fashion as the previous embodiments of the present invention.

Figure 29:
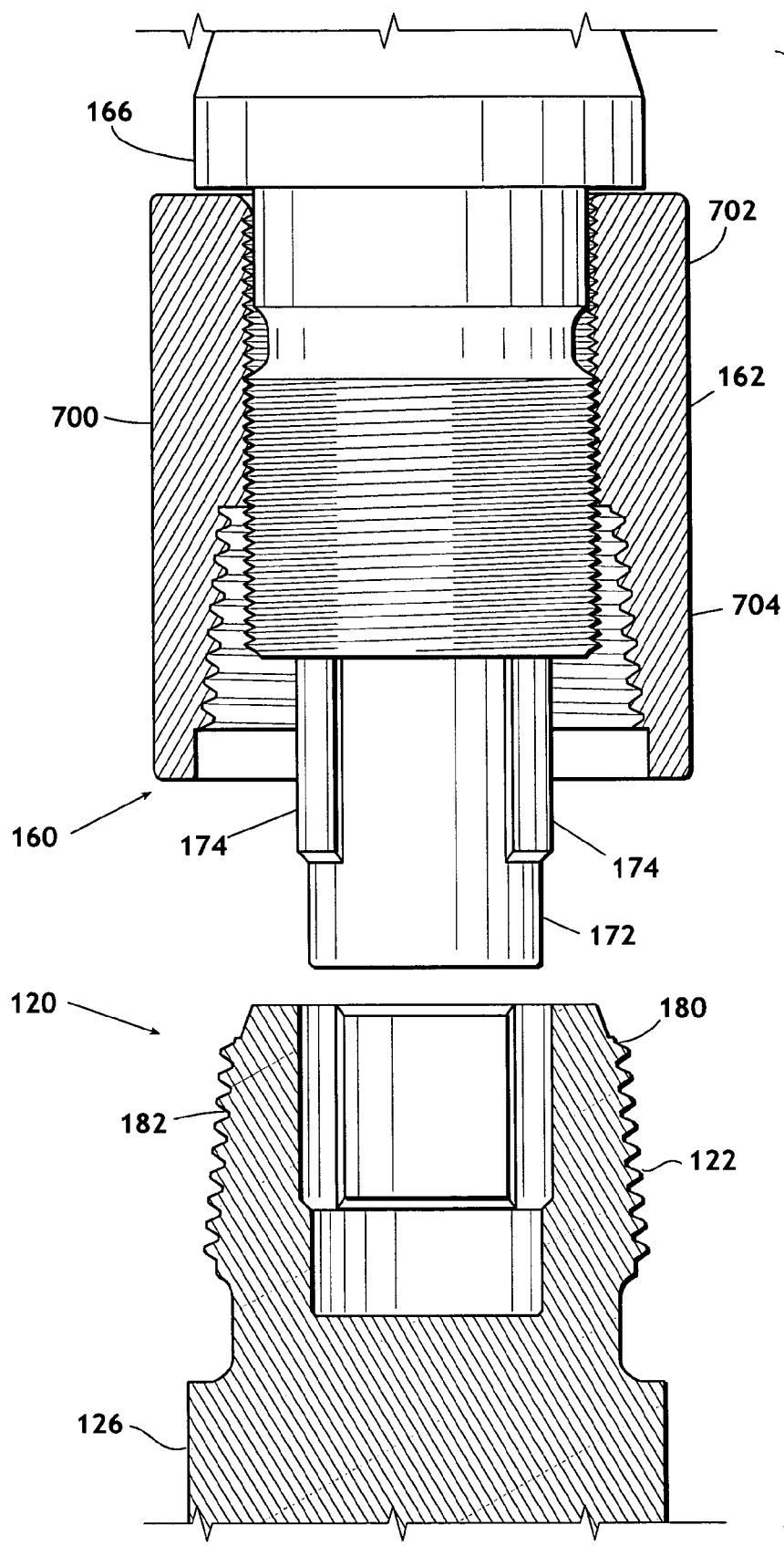
FIG. 29 is an illustration of the solid embodiment of the present invention.

FIG. 29 is an illustration of the solid embodiment of the present invention, similar to the hollow embodiment in FIG. 9. If the user desires to have wires present in the rod, the wires can be placed within the center section of the rod and connected using the connectors illustrated in FIGS. 22 through 28. Persons of ordinary skill in the art will appreciate that the plug and receptacle configuration illustrated in FIG. 29 is only one embodiment of the present invention applied to solid core rods. Persons of ordinary skill in the art will also appreciate that the present invention can be configured with several different configurations of the plug and receptacle or interlocking assemblies described herein.

With respect to the above description then, it is to be realized that the optimum dimensional relationships for the parts of the invention, to include variations in size, materials, shape, form, function, and manner of operation, assembly, and use, are deemed readily apparent and obvious to one skilled in the art. Moreover, the present invention intends to encompass all equivalent relationships to those illustrated in the drawings and described in the specification.

What is claimed is:

1. An apparatus for joining a first rod section and a second rod section together, comprising:
    a plug fixedly engaged to a first rod section proximate end and having a plug center spline, a plurality of outer splines, a plurality of first conduits and a plurality of first connectors;
    a socket fixedly engaged to a second rod section distal end and having a socket receptacle, a plurality of socket receptacle splines, a plurality of second conduits, and a plurality of second connectors;
    a securing device for securing the plug to the socket;
    wherein the plug may be joined to the socket in a plurality of orientations so that, in each of the plurality of orientations, the plug mates with the socket;
    wherein a cavity created by the socket receptacle and the plurality of socket receptacle splines is shaped so that the plug center spline and the plurality of plug outer splines will intermesh with the socket receptacle and the socket receptacle splines when the plug and socket are plugged together;
    wherein the plurality of plug outer splines and the plurality of socket receptacle splines are coaxially symmetric and have the same dimensions so that an alignment of the plurality of first connectors and the plurality of second connectors can be achieved in the plurality of orientations;
    wherein the plug the center spline, the plurality of outer splines, and the plurality of first conduits are of unitary construction with each other; and
    wherein the socket, the socket receptacle, the plurality of socket receptacle splines, and the plurality of second conduits are of unitary construction with each other.

2. The apparatus of claim 1, wherein the securing device is a coupling collar adapted for connecting it to the plug and the socket, the coupling collar initially engaged with the plug.

* * * * *